(12) United States Patent
Jin et al.

(10) Patent No.: US 12,292,358 B2
(45) Date of Patent: May 6, 2025

(54) GAS DENSITY RELAY WITH SEALING PERFORMANCE SELF-CHECKING FUNCTION, AND IMPLEMENTATION METHOD THEREFOR

(71) Applicant: SHANGHAI ROYE ELECTRIC CO., LTD., Shanghai (CN)

(72) Inventors: Haiyong Jin, Shanghai (CN); Tiexin Xia, Shanghai (CN); Zhengcao Guo, Shanghai (CN); Haisheng Jin, Shanghai (CN); Qing Tan, Shanghai (CN)

(73) Assignee: Shanghai Roye Electric Co., Ltd., Shanghai (CN)

( * ) Notice: Subject to any disclaimer, the term of this patent is extended or adjusted under 35 U.S.C. 154(b) by 164 days.

(21) Appl. No.: 17/997,544

(22) PCT Filed: Feb. 9, 2021

(86) PCT No.: PCT/CN2021/076133
§ 371 (c)(1),
(2) Date: Oct. 29, 2022

(87) PCT Pub. No.: WO2021/218287
PCT Pub. Date: Nov. 4, 2021

(65) Prior Publication Data
US 2023/0221209 A1    Jul. 13, 2023

(30) Foreign Application Priority Data
Apr. 29, 2020   (CN) .............................. 202010355134

(51) Int. Cl.
*G01M 3/28*   (2006.01)
*G01N 9/26*   (2006.01)

(52) U.S. Cl.
CPC .......... *G01M 3/2869* (2013.01); *G01N 9/266* (2013.01)

(58) Field of Classification Search
CPC .... G01M 3/2869; G01M 3/3236; G01M 3/16; G01M 3/20; G01M 3/24; G01M 3/26;
(Continued)

(56) References Cited

FOREIGN PATENT DOCUMENTS

| CN | 2906595 Y | 5/2007 |
|---|---|---|
| CN | 101221109 A | 7/2008 |

(Continued)

*Primary Examiner* — Robert R Raevis
(74) *Attorney, Agent, or Firm* — Hsuanyeh Law Group, PC

(57) ABSTRACT

The present application provides a gas density relay with sealing performance self-checking function and an implementation method therefor. The gas density relay includes a gas density relay body, a sealing performance detector and an intelligent control unit; the sealing performance detector is communicated with a gas path of the gas density relay body or a sealed cavity in the gas density relay body to obtain gas leakage information of the gas density relay body; the intelligent control unit is connected with the sealing performance detector, receives and/or calculates the data and/or information monitored by the sealing performance detector, and performs diagnosis to obtain the current sealing performance of the gas density relay body; or, the intelligent control unit uploads the received data and/or information to a background, and the background performs diagnosis to obtain the current sealing performance of the gas density relay body. The gas density relay is used to monitor the gas density of gas insulated or arc extinguishing electrical equipment, and the gas leakage performance of the gas density relay can also be monitored on line, which reduces operation and maintenance costs and ensures safe operation of a power grid.

19 Claims, 6 Drawing Sheets

(58) Field of Classification Search
CPC ........... G01M 3/38; G01N 9/266; G01N 9/00; H01H 35/2671
USPC ........ 73/30.01–30.3, 32 R, 40, 40.5 R, 49.6, 73/49.8
See application file for complete search history.

(56) References Cited

FOREIGN PATENT DOCUMENTS

| | | | |
|---|---|---|---|
| CN | 108321007 A | | 7/2018 |
| CN | 110429002 A | | 11/2019 |
| CN | 110568350 A | | 12/2019 |
| CN | 110849768 A | | 2/2020 |
| CN | 111487017 A | | 8/2020 |
| CN | 211719505 U | * | 10/2020 |
| CN | 211927197 U | | 11/2020 |
| JP | 2000139009 A | | 5/2000 |

* cited by examiner

GAS DENSITY RELAY WITH SEALING PERFORMANCE SELF-CHECKING FUNCTION, AND IMPLEMENTATION METHOD THEREFOR

RELATED APPLICATIONS

This is a US national stage application of international application no. PCT/CN2021/076133, filed, Feb. 9, 2021, which claims priority to Chinese patent application No. 202010355134.0, filed on Apr. 29, 2020 (The title of the invention: GAS DENSITY RELAY WITH SEALING PERFORMANCE SELF-CHECKING FUNCTION AND IMPLEMENTATION METHOD THEREFOR).

TECHNICAL FIELD

The present invention relates to the field of electric power technology, in particular to a gas density relay with sealing performance self-checking function applied to high-voltage and medium-voltage electrical equipment and an implementation method therefor.

BACKGROUND

At present, SF6 (sulfur hexafluoride) electrical equipment has been widely used in power sectors and industrial and mining enterprises, and has promoted the rapid development of power industry. In recent years, with the rapid development of economy, the capacities of power systems in China have expanded rapidly, and the use of SF6 electrical equipment is increasing. SF6 gas has the effects of arc extinction and insulation in high-voltage electrical equipment. If the density of SF6 gas decreases and the micro water content exceeds the standard in the high-voltage electrical equipment, the safe operation of the SF6 high-voltage electrical equipment will be seriously affected. 1) The density of SF6 gas decreases to a certain extent, which will lead to the loss of insulation and arc extinguishing performance. 2) Under the participation of some metals, SF6 gas can hydrolyze with water at a high temperature above 200° C. to generate active HF and $SOF_2$ which corrode insulating parts and metal parts, and to generate a lot of heat to increase the pressure in a gas chamber. 3) When the temperature decreases, excessive moisture may form condensed dew, which significantly reduces the insulation strength on the surfaces of insulating parts and even flashes over to cause serious harm. Therefore, the power grid operation regulations stipulate that the density and water content of SF6 gas must be tested regularly before and during the operation of the equipment. In addition, from the actual operation, the phenomenon of gas leakage at observation windows (surface glass) of oil-filled electric contact density relays universally used at present is very common, which seriously affects the safety and reliability of systems. The performance of a leaking gas density relay is greatly degraded, and the leaking oil affects the reliable operation of electrical equipment, so the gas leakage needs to be found and dealt in time.

With the development of unattended substations towards networking and digitalization and the increasing requirements for remote control and telemetry, it is of great practical significance to monitor the gas density and micro water content of SF6 electrical equipment on line. With the vigorous development of smart grids in China, smart high-voltage electrical equipment, as an important part and key node of smart substations, plays an important role in the safety of smart grid. At present, most high-voltage electrical equipment is SF6 gas insulated equipment. If the gas density decreases (caused by leakage or like), the electrical performance of the equipment will be seriously affected to cause serious hidden dangers to safe operation. At present, on-line monitoring of gas density in SF6 high-voltage electrical equipment has become very common, so the application of gas density monitoring systems (gas density relays) will flourish. The existing gas density monitoring systems (gas density relays) are almost implemented as follows. 1) A remote SF6 gas density relay is used to collect and upload the density, pressure and temperature, so as to realize on-line monitoring of gas density. 2) A gas density transmitter is used to collect and upload the density, pressure and temperature, so as to realize on-line monitoring of gas density. The SF6 gas density relay and the remote SF6 gas density relay or gas density transmitter as the core and key components are very critical to ensure normal operation. 3) The performance of a leaking gas density relay is greatly degraded, and the leaking oil affects the reliable operation of electrical equipment, so the gas leakage needs to be monitored on line, found in time and dealt in time.

Therefore, it is very necessary to develop a gas density relay or gas density monitoring device with sealing performance self-checking function that is applied to a gas density monitoring system based on the ubiquitous power Internet of Things, which is beneficial to the sealing performance detection of the existing gas density relay shell, realizes maintenance-free, improves efficiency and ensures safety.

SUMMARY

The objective of the present invention is to provide a gas density relay (or gas density monitoring device) with sealing performance self-checking function for high-voltage or medium-voltage electrical equipment and an implementation method therefor, where the gas density relay is used to monitor the gas density of gas insulated or arc extinguishing electrical equipment, and the gas leakage performance of the gas density relay can also be monitored on line, which improves efficiency, realizes maintenance-free, reduces operation and maintenance costs, and ensures safe operation of a power grid.

In order to achieve the above objective, the present invention adopts the following technical solution:

The first aspect of the present application provides a gas density relay (or gas density monitoring device) with sealing performance self-checking function, including: a gas density relay body, a sealing performance detector and an intelligent control unit.

The sealing performance detector is disposed inside or outside the gas density relay body and communicated with a gas path in the gas density relay body or an inner cavity of the gas density relay body, and obtains gas leakage information of the gas density relay body by collecting the gas pressure change, current change, gas concentration change or gas density value change on the gas path or in the inner cavity;

The intelligent control unit is connected with the sealing performance detector, receives and/or calculates the data and/or information monitored by the sealing performance detector, and performs diagnosis to obtain the current sealing performance of the gas density relay body; or, the intelligent control unit uploads the received data and/or information to a background, and the background diagnoses the received and/or calculated data and/or information monitored by the sealing performance detector to obtain the current sealing performance of the gas density relay body.

The constituent elements of the above-mentioned gas density relay with sealing performance self-checking function are designed into an integrated structure; and the constituent elements of the gas density monitoring device with sealing performance self-checking function are designed into a flexible split structure.

Preferably, the sealing performance detector includes one or more of an electronic control valve, a pressure sensor, a voltage exciter, an electrode, a current detector, an oxygen sensor, a nitrogen sensor, an SF6 diagnosis sensor, a halogen sensor, a camera, an output signal contact, a thermal conductivity cell (TCD) detector, a spectrum analyzer, and an on-line calibration unit.

More preferably, the sealing performance detector is disposed outside the gas density relay body and includes an electronic control valve and a pressure sensor; one end of the electronic control valve is provided with a gas inlet port connected with electrical equipment, and the other end is provided with a gas outlet port communicated with the gas path of the gas density relay body; the pressure sensor is communicated with the gas path of the gas density relay body; the electronic control valve is connected with the intelligent control unit and closed or opened under the control of the intelligent control unit; the pressure sensor is connected with the intelligent control unit and sends the collected gas pressure on the gas path of the gas density relay body to the intelligent control unit;

If the gas pressure on the gas path of the gas density relay body gradually decreases, the intelligent control unit or the background sends out a gas leakage alarm signal and/or information; or, when the drop speed $PS_X$ of the gas pressure on the gas path of the gas density relay body is higher than a set drop speed $PS_{XS}$, the intelligent control unit or the background sends out a gas leakage alarm signal and/or information; or, in a set time, when the gas pressure on the gas path of the gas density relay body is lower than a gas pressure value when the electronic control valve is closed, the intelligent control unit or the background sends out a gas leakage alarm signal and/or information.

More preferably, the sealing performance detector is a pressure sensor disposed in a shell of the gas density relay body, and the pressure sensor is connected with the intelligent control unit and sends the collected pressure signal $P_{shell}$ in the shell of the gas density relay body to the intelligent control unit;

If the pressure signal $P_{shell}$ in the shell of the gas density relay body gradually increases, the intelligent control unit or the background sends out a gas leakage alarm signal and/or information; or, when the rising speed $PS_{shellZ}$ of the pressure signal $P_{shell}$ in the shell of the gas density relay body is higher than a set rising speed $PS_{shellZS}$, the intelligent control unit or the background sends out a gas leakage alarm signal and/or information; or, when the pressure signal $P_{shell}$ in the shell of the gas density relay body is higher than a set pressure value $P_{shellS}$, the intelligent control unit or the background sends out a gas leakage alarm signal and/or information.

More preferably, the sealing performance detector includes a voltage exciter, an electrode, and a current detector, which are disposed in the shell of the gas density relay body; or, the sealing performance detector includes a voltage exciter, an electrode, a current detector, and a gas hood which is disposed outside the gas density relay body and communicated with the shell of the gas density relay body, the gas hood and the inner cavity of the shell form a cavity together, and the voltage exciter, the electrode and the current detector are disposed in the gas hood;

The voltage exciter, the electrode and the current detector form a loop, a high voltage is applied to both ends of the electrode by the voltage exciter, and the intelligent control unit monitors the leakage current $I_{leakage}$ of the current detector;

If the leakage current $I_{leakage}$ gradually decreases, the intelligent control unit or the background sends out a gas leakage alarm signal and/or information; or, when the leakage current $I_{leakage}$ is lower than a set leakage current $I_{leakageS}$, the intelligent control unit or the background sends out a gas leakage alarm signal and/or information; or, the leakage current is $I_{leakage1}$ when no gas leaks, and if $(I_{leakage1}-I_{leakage})$ is greater than or equal to a preset threshold, the intelligent control unit or the background sends out a gas leakage alarm signal and/or information.

More preferably, the sealing performance detector includes an oxygen sensor and/or nitrogen sensor disposed in the shell of the gas density relay body; or, the sealing performance detector includes an oxygen sensor and/or nitrogen sensor and a gas hood, the gas hood is disposed outside the gas density relay body and communicated with the shell of the gas density relay body, the gas hood and the inner cavity of the shell form a cavity together, and the oxygen sensor and/or nitrogen sensor are disposed in the gas hood;

The intelligent control unit monitors the oxygen concentration and/or nitrogen concentration in the shell through the oxygen sensor and/or nitrogen sensor, and when the monitored oxygen concentration and/or nitrogen concentration are lower than preset thresholds, the intelligent control unit or the background sends out a gas leakage alarm signal and/or information; or, when the monitored oxygen concentration and/or nitrogen concentration are lower than the normal oxygen concentration and/or nitrogen concentration, the intelligent control unit or the background sends out a gas leakage alarm signal and/or information.

More preferably, the sealing performance detector includes an SF6 diagnosis sensor disposed in the shell of the gas density relay body; or, the sealing performance detector includes an SF6 diagnosis sensor and a gas hood, the gas hood is disposed outside the gas density relay body and communicated with the shell of the gas density relay body, the gas hood and the inner cavity of the shell form a cavity together, and the SF6 diagnosis sensor is disposed in the gas hood;

The intelligent control unit monitors the SF6 gas concentration in the shell through the SF6 diagnosis sensor, and when the monitored SF6 gas concentration is higher than a preset threshold, the intelligent control unit or the background sends out a gas leakage alarm signal and/or information; or, when the monitored SF6 gas concentration is higher than the normal SF6 gas concentration, the intelligent control unit or the background sends out a gas leakage alarm signal and/or information.

Further, the SF6 diagnosis sensor includes one of an ultrasonic sensor, an infrared sensor, a laser external sensor, and a gas-sensitive semiconductor sensor.

More preferably, the sealing performance detector is disposed outside the gas density relay body and includes an electronic control valve and a camera; one end of the electronic control valve is provided with a gas inlet port connected with electrical equipment, and the other end is provided with a gas outlet port communicated with the gas path of the gas density relay body; the camera is disposed corresponding to a display part of the gas density relay body; the electronic control valve is connected with the intelligent control unit and closed or opened under the control of the intelligent control unit; the camera obtains a gas density value on the gas path of the gas density relay body through image recognition technology and sends the gas density value to the intelligent control unit;

If the gas density value on the gas path of the gas density relay body gradually decreases, the intelligent control unit or the background sends out a gas leakage alarm signal and/or information; or, when the drop speed $PS_{20X}$ of the gas density value on the gas path of the gas density relay body is higher than a set drop speed $PS_{20XS}$, the intelligent control unit or the background sends out a gas leakage alarm signal and/or information; or, in a set time, when the gas density value on the gas path of the gas density relay body is lower than a gas density value when the electronic control valve is closed, the intelligent control unit or the background sends out a gas leakage alarm signal and/or information.

Further, the sealing performance detector further includes a test paper or chemical change reagent disposed on the gas density relay body; when gas leakage occurs in the gas density relay, the test paper or chemical change reagent changes color, the camera obtains a color change image through image recognition technology to obtain gas leakage information of the gas density relay, and the intelligent control unit or the background sends out a gas leakage alarm signal and/or information.

Further, the camera is movable and/or rotatable.

Further, the camera is provided with a shield.

Further, the information of the gas density relay obtained by the camera through the image recognition technology includes one or more of gas leakage, water inflow, rusting, foreign matter invasion, dial blurring, rubber aging, rubber fracture, device breakage, device drop, and device jamming.

More preferably, the sealing performance detector is an output signal contact, which is disposed on the gas density relay body and connected with the intelligent control unit; the intelligent control unit or the background sends out a gas leakage alarm signal and/or information when the output signal contact acts; or, The sealing performance detector includes an electronic control valve and an output signal contact, the electronic control valve is disposed outside the gas density relay body, one end of the electronic control valve is provided with a gas inlet port connected with electrical equipment, the other end is provided with a gas outlet port communicated with the gas path of the gas density relay body, and the electronic control valve is connected with the intelligent control unit and closed or opened under the control of the intelligent control unit; the output signal contact is disposed on the gas density relay body and connected with the intelligent control unit; and the intelligent control unit or the background sends out a gas leakage alarm signal and/or information after the electronic control valve is closed and when the output signal contact acts.

More preferably, the sealing performance detector includes a thermal conductivity cell (TCD) detector and/or spectrum analyzer disposed in the shell of the gas density relay body; or, the sealing performance detector includes a thermal conductivity cell (TCD) detector and/or spectrum analyzer and a gas hood, the gas hood is disposed outside the gas density relay body and communicated with the shell of the gas density relay body, the gas hood and the inner cavity of the shell form a cavity together, and the thermal conductivity cell (TCD) detector and/or spectrum analyzer are disposed in the gas hood;

The intelligent control unit monitors the SF6 gas concentration in the sealed cavity through the thermal conductivity cell (TCD) detector and/or spectrum analyzer, and when the monitored SF6 gas concentration is higher than a preset threshold, the intelligent control unit or the background sends out a gas leakage alarm signal and/or information; or, when the monitored SF6 gas concentration is higher than the normal SF6 gas concentration, the intelligent control unit or the background sends out a gas leakage alarm signal and/or information.

More preferably, the sealing performance detector includes an on-line calibration unit including a gas density detection sensor, a pressure regulating mechanism and an on-line calibration contact signal sampling unit; the gas path of the pressure regulating mechanism is communicated with the gas path of the gas density relay body, and the pressure regulating mechanism is configured to regulate the pressure rise and drop of the gas density relay body, so that a contact signal control part of the gas density relay generates a contact signal action; the gas density detection sensor is communicated with the contact signal control part on the gas path; the on-line calibration contact signal sampling unit is connected with the contact signal control part and configured to sample a contact signal of the contact signal control part; the intelligent control unit is connected with the pressure regulating mechanism, the gas density detection sensor, and the on-line calibration contact signal sampling unit respectively and configured to complete the control of the pressure regulating mechanism, pressure value acquisition and temperature value acquisition, and/or gas density value acquisition, and to detect the contact signal action value of the contact signal control part, where the contact signal includes alarm and/or locking;

When the detected contact signal action value is less than a preset threshold, the intelligent control unit or the background sends out a gas leakage alarm signal and/or information; or, at time T1, the detected contact signal action value is $P_{20T1}$; after a set time, at time T2, the detected contact signal action value is $P_{20T2}$; and when ($P_{20T1}-P_{20T2}$) is greater than or equal to the preset threshold, the intelligent control unit or the background sends out a gas leakage alarm signal and/or information.

Further, the pressure regulating mechanism is a closed gas chamber communicated with the gas path of the gas density relay body; a heating element and/or a refrigerating element are disposed outside or inside the closed gas chamber, and the temperature of gas in the closed gas chamber is changed by means of heating of the heating element and/or refrigeration of the refrigerating element, thus completing the pressure rise and drop of the gas density relay body; or, The pressure regulating mechanism is a cavity with one end open, and the other end of the cavity is communicated with the gas path of the gas density relay body; a piston is disposed in the cavity, one end of the piston is connected with a regulating rod, the outer end of the regulating rod is connected with a driving part, the other end of the piston extends into the opening and is in sealed contact with the inner wall of the cavity, and the driving part drives the regulating rod to drive the piston to move in the cavity; or, The pressure regulating mechanism is a closed gas chamber communicated with the gas path of the gas density relay body; a piston is disposed inside the closed gas chamber, the piston is in sealed contact with the inner wall of the closed gas chamber, and a driving part is disposed outside the closed gas chamber, and the driving part pushes the piston to move in the cavity by means of electromagnetic force; or, The pressure regulating mechanism is a gasbag with one end connected with a driving part, the gasbag changes in volume under the drive of the driving part, and the gasbag is communicated with the gas path of the gas density relay body; or, The pressure regulating mechanism is a corrugated tube, one end of the corrugated tube is communicated with the gas path of the gas density relay body, and the other end of the corrugated tube expands and contracts under the drive of a driving part; or, The pressure regulating mechanism is a bleeder valve which is a solenoid valve or an electric valve or other bleeder valve realized by an electric or pneumatic way; or, The pressure regulating mechanism is a compressor; or, The pressure regulating mechanism is a pump, and the pump includes one of a pressure generating pump, a booster pump, an electric air pump, and an electromagnetic air pump; or, The pressure regulating mechanism is a pressure increasing valve;

The driving part includes a magnetic driving mechanism, a motor, a reciprocating mechanism, a Carnot cycle mechanism, a magnetic coupling thrust mechanism, a heating thrust generating mechanism, an electric heating thrust generating mechanism, a chemical reaction thrust generating mechanism, and a pneumatic element.

Preferably, the sealing performance detector and the intelligent control unit are designed integrally or independently.

Preferably, the gas density relay body and the sealing performance detector are of an integrated structure; and preferably, the gas density relay body and the sealing performance detector constitute a remote gas density relay with an integrated structure.

Preferably, the gas density relay (or gas density monitoring device) further includes a gas leakage shutoff part and a contact isolation unit, and the intelligent control unit is connected with the gas leakage shutoff part and the contact isolation unit respectively; one end of the gas leakage shutoff part is connected with the electrical equipment, and the other end of the gas leakage shutoff part is connected with the gas density relay body; the gas leakage shutoff part is configured to close the gas path connecting the electrical equipment and the gas density relay body when the sealing performance of the gas density relay body is abnormal; the contact isolation unit is further directly or indirectly connected with the gas density relay body and configured to disconnect the contact of the gas density relay body from the contact signal control loop when the gas leakage shutoff closes.

More preferably, the gas leakage shutoff part includes one of an electronic control valve, a solenoid valve, an electronic control self-sealing valve, and a temperature control valve.

More preferably, the gas density relay (or gas density monitoring device) further includes an equipment side gas density detection sensor, the equipment side gas density detection sensor is disposed on the side of the gas leakage shutoff part connected with the electrical equipment, and the equipment side gas density detection sensor is connected with the intelligent control unit and configured to monitor the gas density value PSB20 of the electrical equipment;

The contact isolation unit includes an isolation connection circuit which connects the contact of the gas density relay body with the contact signal control loop;

When the gas leakage shutoff closes, if the gas density value PSB20 of the electrical equipment monitored by the equipment side gas density detection sensor is greater than a preset threshold, the contact isolation unit cuts off the isolation connection circuit, so that the contact of the gas density relay body is not connected with the contact signal control loop; if the gas density value PSB20 of the electrical equipment monitored by the equipment side gas density detection sensor is less than or equal to the preset threshold, the isolation connection circuit is closed, so that the contact of the gas density relay body is connected with the contact signal control loop.

Preferably, at least two gas density relays (or gas density monitoring devices) are connected with a remote background detection system through communication equipment, where the gas density relays (or gas density monitoring devices) are disposed on the electrical equipment with corresponding gas chambers, and the communication mode of the communication equipment includes wired communication and wireless communication.

Preferably, the intelligent control unit is controlled in field and/or by the background.

Preferably, at least two gas density relays (or gas density monitoring devices) are sequentially connected with the remote background detection system through hubs and a protocol converter, where the gas density relays (or gas density monitoring devices) are disposed on the electrical equipment with corresponding gas chambers.

More preferably, the hub is an RS485 hub; and the protocol converter is an IEC61850 or IEC104 protocol converter.

The second aspect of the present application provides an implementation method for the gas density relay with sealing performance self-checking function, including:

A sealing performance detection detector is disposed inside or outside the gas density relay body and communicated with the gas path in the gas density relay body or the inner cavity of the gas density relay body to obtain gas leakage information of the gas density relay body by collecting the gas pressure change, current change, gas concentration change or gas density value change on the gas path or in the inner cavity;

The intelligent control unit is connected with the sealing performance detection detector, and the intelligent control unit receives and/or calculates the data and/or information monitored by the sealing performance detection unit, and performs diagnosis to obtain the current sealing performance of the gas density relay body; or, The intelligent control unit uploads the received data and/or information to the background, and the background diagnoses the received and/or calculated data and/or information monitored by the sealing performance detector to obtain the current sealing performance of the gas density relay body.

Preferably, the sealing performance detector includes one or more of an electronic control valve, a pressure sensor, a voltage exciter, an electrode, a current detector, an oxygen sensor, a nitrogen sensor, an SF6 diagnosis sensor, a halogen sensor, a camera, an output signal contact, a thermal conductivity cell (TCD) detector, a spectrum analyzer, and an on-line calibration unit.

Preferably, the gas density relay further includes a gas leakage shutoff part, a contact isolation unit and an equipment side gas density detection sensor; one end of the gas leakage shutoff part is connected with the electrical equipment, the other end of the gas leakage shutoff part is connected with the gas density relay body, the contact isolation unit includes an isolation connection circuit, the isolation connection circuit is connected with the contact of the gas density relay body and the contact signal control loop, the equipment side gas density detection sensor is disposed on the side of the gas leakage shutoff part connected with the electrical equipment, and the equipment side gas density detection sensor is connected with the intelligent control unit; the implementation method further includes:

When the sealing performance of the gas density relay body is abnormal, the intelligent control unit closes the gas path connecting the electrical equipment and the gas density relay body by controlling the gas leakage shutoff part; when the gas leakage shutoff closes, if the gas density value $P_{SB20}$ of the electrical equipment monitored by the equipment side gas density detection sensor is greater than a preset threshold, the intelligent control unit controls the contact isolation unit to cut off the isolation connection circuit, so that the contact of the gas density relay body is not connected with the contact signal control loop; if the gas density value $P_{SB20}$ of the electrical equipment monitored by the equipment side gas density detection sensor is less than or equal to the preset threshold, the intelligent control unit controls the contact isolation unit to close the isolation connection circuit, so that the contact of the gas density relay body is connected with the contact signal control loop.

Compared with the prior art, the technical solution of the present invention has the following beneficial effects.

1) A gas density relay (or gas density monitoring device) with sealing performance self-checking function is provided to monitor the gas density of gas insulated or arc extinguishing electrical equipment, and the gas leakage performance of the gas density relay can also be monitored on line, which improves efficiency, realizes maintenance-free, reduces operation and maintenance costs, and ensures safe operation of a power grid.

2) An implementation method for the gas density relay with sealing performance self-checking function is provided, which can support the normal operation of the gas density relay with sealing performance self-checking function.

BRIEF DESCRIPTION OF THE DRAWINGS

The accompanying drawings constituting a part of the present application are intended to provide a further understanding of the present application, and the illustrative embodiments of the present application and the descriptions thereof are intended to interpret the present application and do not constitute improper limitations to the present application. In the figures.

DETAILED DESCRIPTION

In order to make the objectives, technical solutions and effects of the present invention clearer, the following further describes the present invention in detail with reference to the accompanying drawings and examples. It should be understood that the specific embodiments are merely used for interpreting the present invention, rather than limiting the present invention.

Embodiment 1

Figure 1:
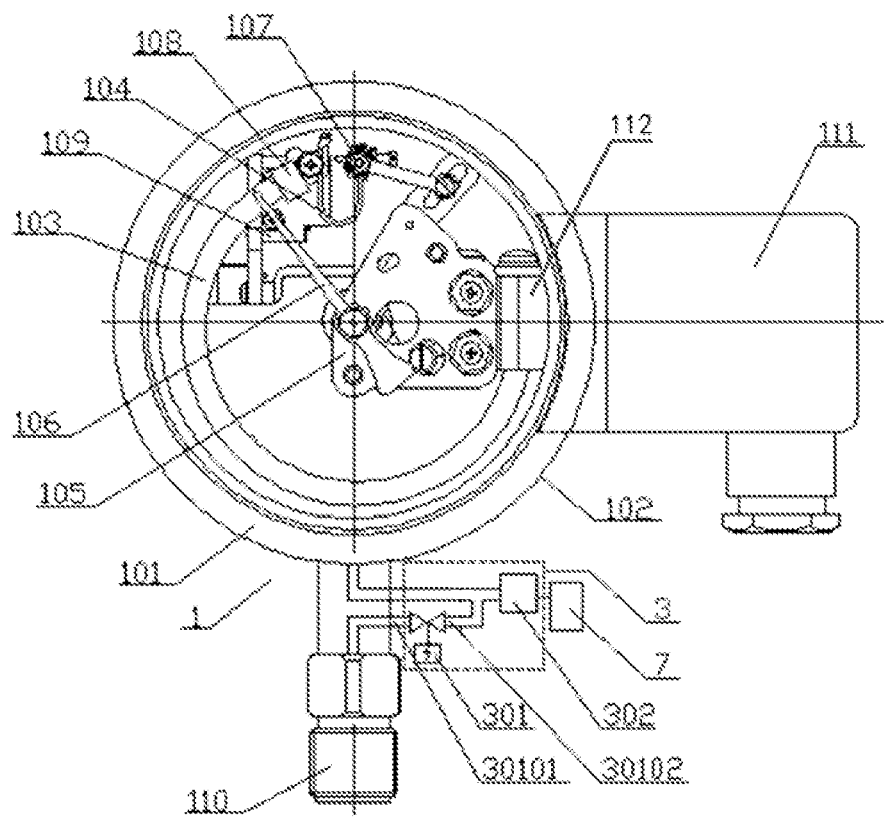
FIG. 1 is a schematic structural diagram of a gas density relay with sealing performance self-checking function for high- and medium-voltage electrical equipment according to a first embodiment.

As shown in FIG. 1, a gas density relay (or gas density monitoring device) with sealing performance self-checking function mainly includes a gas density relay body 1, a gas leakage performance diagnosis detector 3 and an intelligent control unit 7. The gas leakage performance diagnosis detector 3 described in this embodiment is disposed outside the gas density relay body 1 and includes an electronic control valve 301, and a pressure sensor 302. The implementation process of this example is that one end of the electronic control valve 301 is provided with a gas inlet port 30101 connected with electrical equipment, the gas inlet port 30101 is connected with the electrical equipment through an equipment connection joint 110, and the other end of the electronic control valve 301 is provided with a gas outlet port 30102 and connected with a gas path of the gas density relay body 1. In this embodiment, the gas outlet port 30102 is connected with a pressure detector 103 (Baden tube) of the gas density relay body 1, and the pressure detector 103 (Baden tube) is filled with SF6 gas. The pressure sensor 302 is communicated with the gas density relay body 1 on the gas path. On a circuit, the electronic control valve 301 and the pressure sensor 302 are connected with the intelligent control unit 7 respectively. The working principle of this embodiment is that the electronic control valve 301 is closed through the intelligent control unit 7, and the collected gas pressure on the gas path of the gas density relay body 1 is uploaded to the intelligent control unit 7 or the background through the pressure sensor 302. If the gas pressure on the gas path of the gas density relay body 1 gradually decreases, the intelligent control unit 7 or the background sends out a gas leakage alarm signal and/or information; or, when the drop speed PSX of the gas pressure on the gas path of the gas density relay body 1 is higher than a set drop speed PSXS, the intelligent control unit 7 or the background sends out a gas leakage alarm signal and/or information; or, in a set time, when the gas pressure on the gas path of the gas density relay body 1 is lower than a gas pressure value when the electronic control valve 301 is closed, the intelligent control unit 7 or the background sends out a gas leakage alarm signal and/or information.

In this embodiment, the gas path of the gas density relay body 1 is opened or closed by means of the electronic control valve 301 connected with the electrical equipment and the gas path of the gas density relay body, and the intelligent control unit 7 controls the opening and closing of the electronic control valve 301. The gas density relay body 1 includes a shell 102, and a base 112, a pressure detector 103, a temperature compensation element 104, an end seat 108 and a plurality of signal generators 109 disposed in the shell 102. The pressure detector 103 includes a Baden tube or a corrugated tube, a first end of the pressure detector 103 is fixedly connected to the base 112, and a second end is fixedly connected to an end of the end seat 108; the temperature compensation element 104 uses a temperature compensation sheet or a gas enclosed in the shell 102, and the temperature compensation element 104 compensates the temperature for the pressure detector 103; the signal generator 109 includes a micro switch or a magnetically assisted electrical contact, and the gas density relay body 1 outputs an alarm and/or locking contact signal. The gas density relay body 1 monitors the gas density through the pressure detector 103 and the temperature compensation element 104 and outputs a gas density contact signal through the signal generator 109. The principle is that the changing pressure and temperature are corrected based on the pressure detector 103 and using the temperature compensation element 104 to reflect the change of (sulfur hexafluoride) gas density. That is, under the pressure of the detected medium (such as SF6) gas, due to the function of the temperature compensation element 104, when the density value of sulfur hexafluoride (or other) gas changes, the pressure value of the gas also changes accordingly, forcing the tail end of the pressure detector 103 to produce a corresponding elastic deformation displacement, which is transmitted to a movement 105 by means of the temperature compensation element 104, and the movement 105 in turn transmits the elastic deformation displacement to a pointer 106, which indicates the density value of the detected (sulfur hexafluoride) gas on a dial. If gas leaks, the gas density value decreases, the pressure detector 103 produces a corresponding downward displacement, which is transmitted to the movement 105 by means of the temperature compensation element 104, the movement 105 in turn transmits the downward displacement to the pointer 106, the pointer 106 moves in the direction of a small indication value, and the degree of gas leakage is specifically displayed on the dial; meanwhile, the pressure detector 103 drives a beam to move down through the temperature compensation element 104, a regulating part 107 on the beam is gradually separated from the signal generator 109, and to a certain degree, the contact of the signal generator 109 is connected to send out a corresponding contact signal (alarm or locking), thus completing the function of monitoring and controlling the gas density in the equipment such as an electrical switch, so that the electrical equipment can work safely. If the gas density value increases, that is, when the gas density value in the sealed gas chamber is greater than a set gas density value, the pressure value increases correspondingly, the tail end of the pressure detector 103 and the temperature compensation element 104 move up, the temperature compensation element 104 also causes the beam to move up, the regulating part 107 on the beam moves up and pushes the contact of the signal generator 109 to open, and the contact signal (alarm or locking) is released.

In this embodiment, the gas path of the gas density relay body 1 is connected with the electrical equipment through the electronic control valve 301, and the whole gas path of the gas density relay body 1 is in a completely sealed state and needs to keep the sealing performance reliable and stable for a long time to ensure the normal operation of the electrical equipment. When the sealing performance of the gas density relay body 1 needs to be self-checked, the intelligent control unit 7 controls the electronic control valve 301 to close the gas path connected with the electrical equipment, the gas pressure in the gas path of the gas density relay body 1 at this time remains unchanged and an independent sealed gas path is formed. The pressure sensor 302 is communicated with the gas path of the gas density relay body 1 on the gas path, and the pressure sensor 302 uploads the collected gas pressure on the gas path of the gas density relay body 1 to the intelligent control unit 7. If the intelligent control unit 7 receives that the gas pressure on the gas path of the gas density relay body 1 gradually decreases, it indicates that the pressure detector 103 of the gas density relay body 1 leaks gas, then the intelligent control unit 7 or the background sends out a gas leakage alarm signal and/or information; or, when the drop speed $PS_X$ of the gas pressure on the gas path of the gas density relay body 1 is higher than a set drop speed $PS_{XS}$, the intelligent control unit 7 or the background sends out a gas leakage alarm signal and/or information; or, in a certain set time, when the gas pressure on the gas path of the gas density relay body 1 is lower than a gas pressure value when the electronic control valve 301 is closed, the intelligent control unit 7 or the background sends out a gas leakage alarm signal and/or information. In this embodiment, a temperature sensor may be further included, and a density value $P_{20}$ is obtained by means of the pressure sensor 302 and the temperature sensor; if the gas density value $P_{20}$ on the gas path of the gas density relay body 1 gradually decreases, the intelligent control unit 7 or the background sends out a gas leakage alarm signal and/or information; or, when the drop speed $P20S_X$ of the gas density value $P_{20}$ on the gas path of the gas density relay body is higher than a set drop speed $P20S_{XS}$, the intelligent control unit 7 or the background sends out a gas leakage alarm signal and/or information; or, in a set time, when the gas density value $P_{20}$ on the gas path of the gas density relay body is lower than a gas density value when the electronic control valve 301 is closed, the intelligent control unit 7 or the background sends out a gas leakage alarm signal and/or information. After the gas leakage alarm signal and/or information are sent out, the intelligent control unit 7 controls the electronic control valve 301 to reopen the gas path connected with the electrical equipment, then the gas path of the gas density relay body 1 is communicated with the gas path of the electrical equipment, and the gas density relay body 1 continues to monitor the gas density of the electrical equipment.

Alternatively, in this embodiment, an equipment side gas density detection sensor and a contact isolation unit may be further included, the equipment side gas density detection sensor is disposed on the side of the electronic control valve 301 (which may be used as a gas leakage shutoff part) connected with the electrical equipment, and the intelligent control unit 7 is connected with the equipment side gas density detection sensor and configured to monitor the gas density value $P_{SB20}$ of the electrical equipment; the contact isolation unit and the intelligent control unit 7 may be disposed together. When the sealing performance of the gas density relay body 1 is abnormal, that is, when the intelligent control unit 7 or the background sends out a gas leakage alarm signal and/or information, the intelligent control unit 7 controls the electronic control valve 301 (which may be used as a gas leakage shutoff part) to close the gas path connecting the electrical equipment and the gas density relay body 1; when the electronic control valve 301 (which may be used as a gas leakage shutoff part) is closed, the intelligent control unit 7 monitors the gas density value $P_{SB20}$ of the electrical equipment through the equipment side gas density detection sensor; when the monitored gas density value $P_{SB20}$ of the electrical equipment is greater than a preset threshold (generally slightly greater than an alarm value), the intelligent control unit 7 controls the contact isolation unit to disconnect the contact of the gas density relay body 1 from the contact signal control loop; and when the monitored gas density value $P_{SB20}$ of the electrical equipment is less than or equal to the preset threshold, the intelligent control unit 7 controls the contact isolation unit to connect the contact of the gas density relay body 1 with the contact signal control loop continuously. The outstanding advantages of this are as follows: when gas leakage occurs on the gas density relay body 1, the gas path connecting the electrical equipment and the gas density relay body 1 can be closed by controlling the electronic control valve 301 (which may be used as a leak shutoff part) to prevent continued gas leakage, that is, prevent the gas leakage accident from continuing to occur; meanwhile, the intelligent control unit 7 also monitors the gas density value $P_{SB20}$ of the electrical equipment in real time through the equipment side gas density detection sensor, which ensures that the electrical equipment still operates reliably, that is, when the gas density value $P_{SB20}$ is greater than the preset threshold, the contact isolation unit works, and any error signal will not be uploaded to cause locking or false alarm; and when the gas density value $P_{SB20}$ is less than or equal to the preset threshold, the contact isolation unit does not work, and the gas density relay sends out an alarm or locking signal. In addition, the intelligent control unit 7 or the background sends out gas leakage information in time, so that the operation and maintenance personnel can know and deal with the gas leakage event in time.

Embodiment 2

Figure 2:
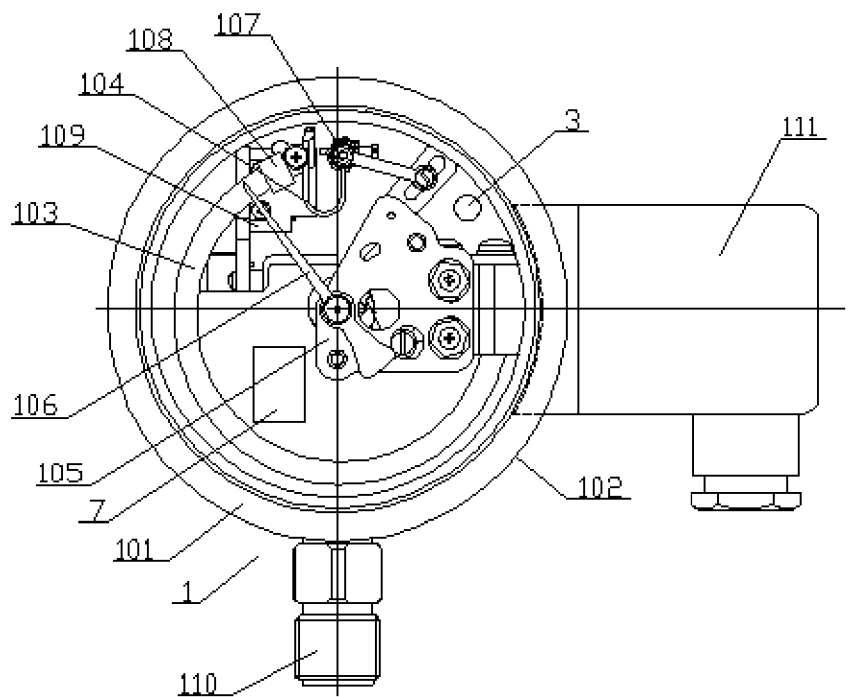
FIG. 2 is a schematic diagram of a front structure of a gas density relay (or gas density monitoring device) with sealing performance self-checking function for high- and medium-voltage electrical equipment according to a second embodiment.

FIG. 2 is a schematic diagram of a front structure of a gas density relay (or gas density monitoring device) with sealing performance self-checking function for high-voltage electrical equipment according to a second embodiment of the present invention. As shown in FIG. 2, different from the first embodiment, the gas leakage performance diagnosis detector 3 in this embodiment is a pressure sensor, and the pressure sensor 3 is disposed in the shell 102 of the gas density relay body 1 and connected with the intelligent control unit 7. The pressure sensor 3 uploads the collected pressure signal P in the shell 102 of the gas density relay body 1 to the intelligent control unit 7. If the pressure signal $P_{shell}$ in the shell 102 of the gas density relay body 1 gradually increases, the intelligent control unit 7 or the background sends out a gas leakage alarm signal and/or information; or, when the rising speed $PS_{shellZ}$ of the pressure signal $P_{shell}$ in the shell 102 of the gas density relay body 1 is higher than a set rising speed $PS_{shellZS}$, the intelligent control unit 7 or the background sends out a gas leakage alarm signal and/or information; or, when the pressure signal $P_{shell}$ in the shell 102 of the gas density relay body 1 is higher than a set pressure value $P_{shellS}$, the intelligent control unit 7 or the background sends out a gas leakage alarm signal and/or information.

The working principle of this example is that the inside of the shell 102 of the gas density relay body 1 is a sealed cavity, the sealed cavity is a sealed space with relatively stable pressure, and the pressure value of the sealed space may be set within a certain range as a set pressure value $P_S$. The pressure sensor 3 is used for detecting the pressure signal P in the sealed cavity and uploading the collected pressure signal P to the intelligent control unit 7. Under normal circumstances, the pressure signal P in the gas density relay body 1 is relatively stable. When gas leakage occurs in the gas path of the gas density relay body 1, the gas leaked from the gas path in the shell 102 will be sealed in the sealed cavity of the shell 102, which will increase the pressure signal P in the shell 102 of the gas density relay body 1. Therefore, when gas leakage occurs, the pressure signal $P_{shell}$ in the shell 102 of the gas density relay body 1 gradually increases, and the intelligent control unit 7 or the background sends out a gas leakage alarm signal and/or information; or, when the rising speed $PS_{shellZ}$ of the pressure signal $P_{shell}$ in the shell 102 of the gas density relay body 1 is higher than the set rising speed $PS_{shellZS}$, the intelligent control unit 7 or the background sends out a gas leakage alarm signal and/or information; or, when the pressure signal $P_{shell}$ in the shell 102 of the gas density relay body 1 is higher than the set pressure value $P_{shellS}$, the intelligent control unit 7 or the background sends out a gas leakage alarm signal and/or information.

Embodiment 3

Figure 3:
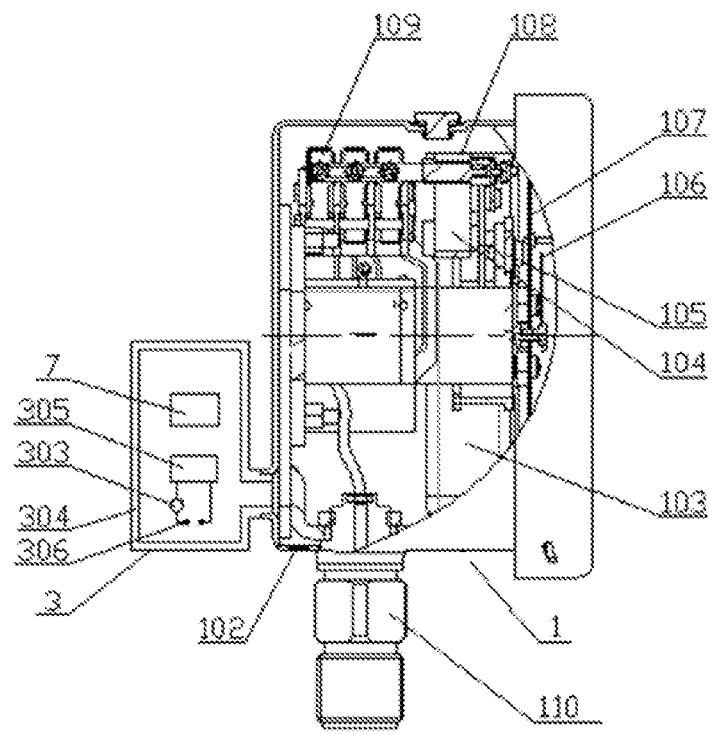
FIG. 3 is a schematic structural diagram of a gas density relay (or gas density monitoring device) with sealing performance self-checking function for high- and medium-voltage electrical equipment according to a third embodiment.

As shown in FIG. 3, a gas density relay (or gas density monitoring device) with sealing performance self-checking function according to a third embodiment of the present invention mainly includes a gas density relay body 1, a sealing performance detector 3 and an intelligent control unit 7. The sealing performance detector 3 includes a voltage exciter 305, an electrode 306, and a current detector 303, which may be disposed in a shell 102 of the gas density relay body 1; or, the sealing performance detector 3 may further include a gas hood 304, which is disposed outside the gas density relay body 1 and communicated with the shell 102 of the gas density relay body 1 to form a cavity, the lower part of the cavity is sealed, or the cavity is preferentially a sealed cavity. The cavity is configured to collect leaked gas, which is equivalent to a leak gas collector. The voltage exciter 305, the electrode 306, the current detector 303, and the intelligent control unit 7 are disposed in the gas hood 304. The voltage exciter 305, the electrode 306, and the current detector 303 form a loop, a certain high voltage is applied to both ends of the electrode 306 by the voltage exciter 305, and the intelligent control unit 7 directly or indirectly monitors the leakage current $I_{leakage}$ of the current detector 303. When the leakage current $I_{leakage}$ gradually decreases, the intelligent control unit 7 or the background sends out a gas leakage alarm signal and/or information; or, when the leakage current $I_{leakage}$ is lower than a set leakage current $I_{leakageS}$, the intelligent control unit 7 or the background sends out a gas leakage alarm signal and/or information; or, the leakage current is $I_{leakage1}$ when no gas leaks, and if ($I_{leakage1}-I_{leakage}$) is greater than or equal to a preset threshold, the intelligent control unit 7 or the background sends out a gas leakage alarm signal and/or information.

The working principle of this embodiment is as follows: the gas hood 304 is disposed outside the gas density relay body 1 and communicated with the shell 102 of the gas density relay body 1 to form a sealed cavity. Under normal circumstances, the sealed cavity is filled with a gas with certain stability, generally dry air. The voltage exciter 305, the electrode 306 and the current detector 303 disposed in the gas hood 304 constitute a loop, a certain high voltage is applied to both ends of the electrode 306 by the voltage exciter 305, and the intelligent control unit 7 directly or indirectly monitors the leakage current $I_{leakage}$ of the current detector 303, where the leakage current $I_{leakage}$ is constant or kept within a certain range under normal circumstances. When the gas path of the gas density relay body 1 leaks gas, the leaked gas will be sealed in the sealed cavity. The gas leaked from the gas path of the gas density relay body 1 is SF6 gas, which has the properties of arc extinction and insulation. Therefore, when the leakage current $I_{leakage}$ caused by the high voltage applied to both ends of the electrode 306 by the voltage exciter 305 in the sealed cavity decreases obviously in the environment with certain SF6 gas content, the intelligent control unit 7 directly or indirectly monitors the leakage current $I_{leakage}$ of the current detector 303 to determine whether the gas density relay body 1 leaks gas.

Embodiment 4

Figure 4:
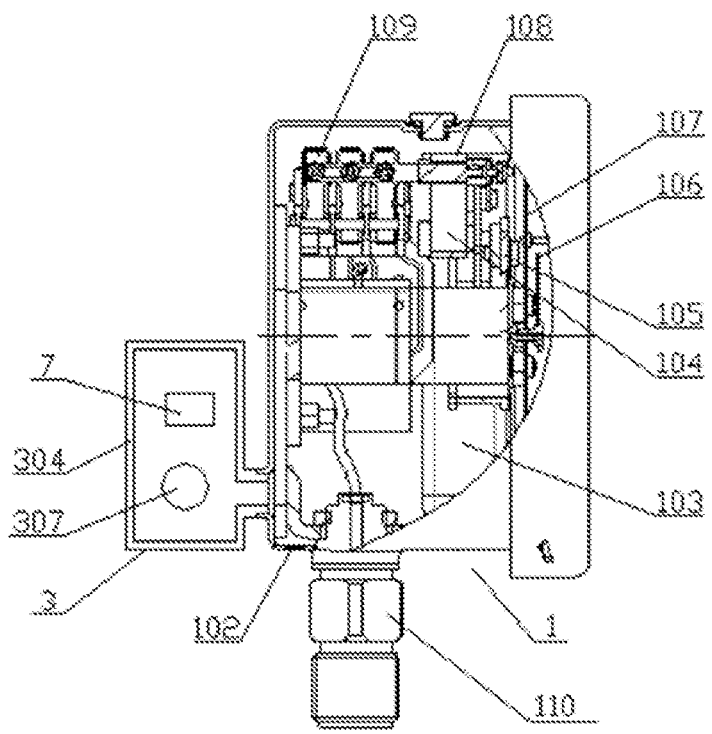
FIG. 4 is a schematic structural diagram of a gas density relay (or gas density monitoring device) with sealing performance self-checking function for high- and medium-voltage electrical equipment according to a fourth embodiment.

As shown in FIG. 4, a gas density relay (or gas density monitoring device) with sealing performance self-checking function according to a fourth embodiment of the present invention mainly includes a gas density relay body 1, a sealing performance detector 3 and an intelligent control unit 7. The sealing performance detector 3 includes an oxygen sensor and/or nitrogen sensor 307 which may be disposed in a shell 102 of the gas density relay body 1; or, the sealing performance detector 3 may further include a gas hood 304 (or a leak gas collector), the gas hood 304 is disposed outside the gas density relay body 1 and communicated with the shell 102 of the gas density relay body 1 to form a cavity (preferentially a sealed cavity), and the oxygen sensor and/or nitrogen sensor 307 and the intelligent control unit 7 are disposed in the gas hood 304. The oxygen sensor and/or nitrogen sensor 307 are connected with the intelligent control unit 7, the intelligent control unit 7 monitors the oxygen concentration and/or nitrogen concentration C through the oxygen sensor and/or nitrogen sensor 307, and when the oxygen concentration and/or nitrogen concentration C are lower than preset thresholds, the intelligent control unit 7 or the background sends out a gas leakage alarm signal and/or information; or, when the monitored oxygen concentration and/or nitrogen concentration C are lower than the normal oxygen concentration and/or nitrogen concentration, the intelligent control unit 7 or the background sends out a gas leakage alarm signal and/or information.

The working principle of this embodiment is as follows: the gas hood 304 is disposed outside the gas density relay body 1 and communicated with the shell 102 of the gas density relay body 1 to form a sealed cavity. Under normal circumstances, the sealed cavity is filled with a gas with certain stability, generally one or more of dry air, nitrogen or other oxygen mixed gases. Normally, the amount of dry air in the sealed cavity is constant, and the oxygen sensor and/or nitrogen sensor 307 are used to monitor the oxygen concentration and/or nitrogen concentration C in the dry air, that is, the oxygen concentration and/or nitrogen concentration C are constant. When gas leakage occurs in the gas path of the gas density relay body 1, the leaked gas will be sealed in the sealed cavity, which will affect the original oxygen concentration and/or nitrogen concentration C and reduce the value of the measured concentration C. The intelligent control unit 7 monitors the oxygen concentration and/or nitrogen concentration C through the oxygen sensor and/or nitrogen sensor 307, and when the oxygen concentration and/or nitrogen concentration C are lower than preset thresholds, the intelligent control unit 7 or the background sends out a gas leakage alarm signal and/or information; or, when the monitored oxygen concentration and/or nitrogen concentration C are lower than the normal oxygen concentration and/or nitrogen concentration, the intelligent control unit 7 or the background sends out a gas leakage alarm signal and/or information.

Embodiment 5

Figure 5:
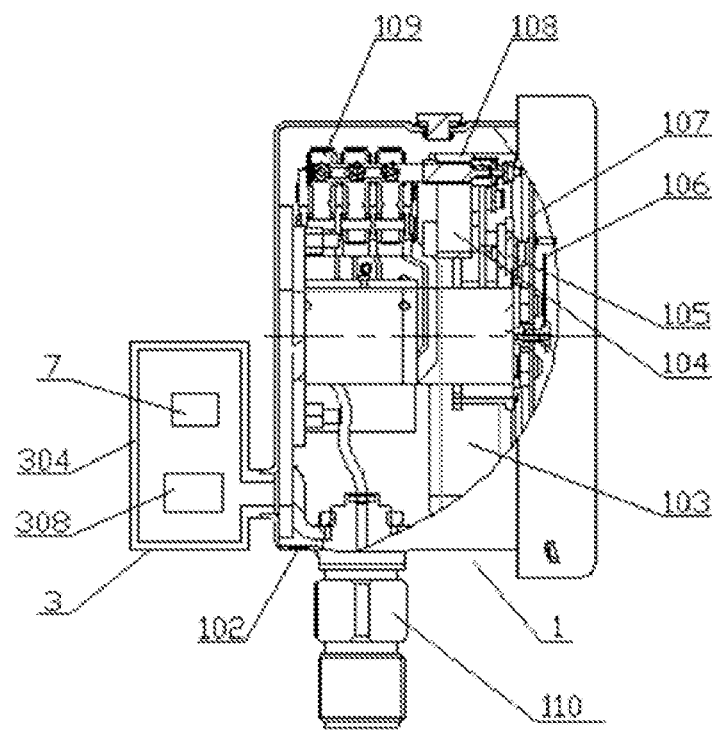
FIG. 5 is a schematic structural diagram of a gas density relay (or gas density monitoring device) with sealing performance self-checking function for high- and medium-voltage electrical equipment according to a fifth embodiment.

As shown in FIG. 5, a gas density relay (or gas density monitoring device) with sealing performance self-checking function according to a fifth embodiment of the present invention mainly includes a gas density relay body 1, a sealing performance detector 3 and an intelligent control unit 7. The sealing performance detector 3 is an SF6 diagnosis sensor 308 which may be disposed in a shell 102 of the gas density relay body 1; or, the sealing performance detector 3 may further include a gas hood 304 (or a leak gas collector), the gas hood 304 is disposed outside the gas density relay body 1 and communicated with the shell 102 of the gas density relay body 1 to form a cavity (preferentially a sealed cavity), and the SF6 diagnosis sensor 308 and the intelligent control unit 7 are disposed in the gas hood 304. The SF6 diagnosis sensor 308 includes, but is not limited to, one of an ultrasonic sensor, an infrared sensor, a laser external sensor, and a gas-sensitive semiconductor sensor. The SF6 diagnosis sensor 308 is connected with the intelligent control unit 7, the intelligent control unit 7 monitors the SF6 gas concentration through the SF6 diagnosis sensor 308, and when the SF6 gas concentration is higher than a preset threshold, the intelligent control unit 7 or the background sends out a gas leakage alarm signal and/or information; or, when the monitored SF6 gas concentration is higher than the normal SF6 gas concentration, the intelligent control unit or the background sends out a gas leakage alarm signal and/or information.

The working principle of this embodiment is as follows: the gas hood 304 is disposed outside the gas density relay body 1 and communicated with the shell 102 of the gas density relay body 1 to form a sealed cavity. Under normal circumstances, the sealed cavity is filled with a gas with certain stability, generally one or more of dry air, nitrogen or other oxygen mixed gases. Normally, the amount of dry air in the sealed cavity is constant, and the SF6 diagnosis sensor 308 is used to monitor the SF6 gas concentration in the dry air, that is, the SF6 gas concentration in the sealed cavity is constant. When gas leakage occurs in the gas path of the gas density relay body 1, the leaked gas will be sealed in the sealed cavity, which will increase the SF6 gas concentration in the sealed cavity. The intelligent control unit 7 monitors the SF6 gas concentration through the SF6 diagnosis sensor, and when the monitored SF6 gas concentration is higher than the preset threshold, the intelligent control unit 7 or the background sends out a gas leakage alarm signal and/or information; or, when the monitored SF6 gas concentration is higher than the normal SF6 gas concentration, the intelligent control unit 7 or the background sends out a gas leakage alarm signal and/or information.

Embodiment 6

Figure 6:
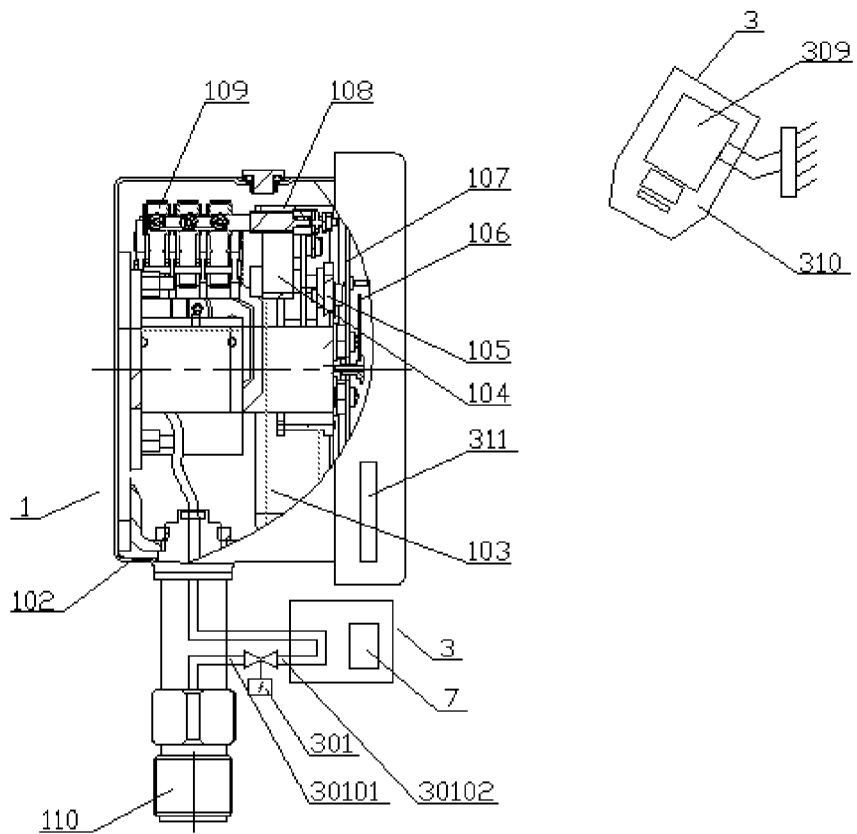
FIG. 6 is a schematic structural diagram of a gas density relay (or gas density monitoring device) with sealing performance self-checking function for high- and medium-voltage electrical equipment according to a sixth embodiment.

As shown in FIG. 6, a gas density relay (or gas density monitoring device) with sealing performance self-checking function according to a sixth embodiment of the present invention mainly includes a gas density relay body 1, a sealing performance detector 3 and an intelligent control unit 7. The sealing performance detector 3 includes an electronic control valve 301 and a camera 309, the electronic control valve 301 is disposed outside the gas density relay body 1, one end of the electronic control valve 301 is provided with a gas inlet port 30101 connected with electrical equipment, and the other end of the electronic control valve 301 is provided with a gas outlet port 30102 and connected with a gas path of the gas density relay body 1. The implementation process of this embodiment is as follows: the gas outlet port 30102 is connected with a pressure detector 103 of the gas density relay body 1, and the pressure detector 103 is filled with SF6 gas. The camera 309 is disposed outside (or inside) the gas density relay body 1 and corresponds to a display part of the gas density relay body 1. On a circuit, the electronic control valve 301 and the camera 309 are connected with the intelligent control unit 7 respectively. The working principle is that the electronic control valve 301 is closed by the intelligent control unit 7, and the camera 309 obtains a gas density value $P_{20}$ on the gas path of the gas density relay body 1 through image recognition technology, and uploads the collected gas density value $P_{20}$ on the gas path of the gas density relay body 1 to the intelligent control unit 7. If the gas density value $P_{20}$ on the gas path of the gas density relay body 1 gradually decreases, the intelligent control unit 7 or the background sends out a gas leakage alarm signal and/or information; or, when the drop speed $PS_{20X}$ of the gas density value $P_{20}$ on the gas path of the gas density relay body 1 is higher than a set drop speed $PS_{20XS}$, the intelligent control unit 7 or the background sends out a gas leakage alarm signal and/or information; or, in a certain time, when the gas density value $P_{20}$ on the gas path of the gas density relay body 1 is lower than a gas density value when the electronic control valve 301 is closed, the intelligent control unit 7 or the background sends out a gas leakage alarm signal and/or information.

In another preferred embodiment, the sealing performance detector 3 further includes a test paper or chemical change reagent 311 disposed on the gas density relay body 1. When gas leakage occurs in the gas density relay, the test paper or chemical change reagent 311 changes color, the camera 309 obtains an image of the color changing test paper 311 through the image recognition technology to obtain gas leakage information of the gas density relay, and the intelligent control unit 7 or the background sends out a gas leakage alarm signal and/or information.

The camera 309 is movable and/or rotatable and can be used for shooting at multiple angles, and the camera 309 may also be provided with a shield 310. The information of the gas density relay obtained by the camera 309 through the image recognition technology includes, but is not limited to, one or more of gas leakage performance, water inflow, rusting, foreign matter invasion, dial blurring, rubber aging, rubber fracture, device breakage, device drop, and device jamming.

Embodiment 7

Figure 7:
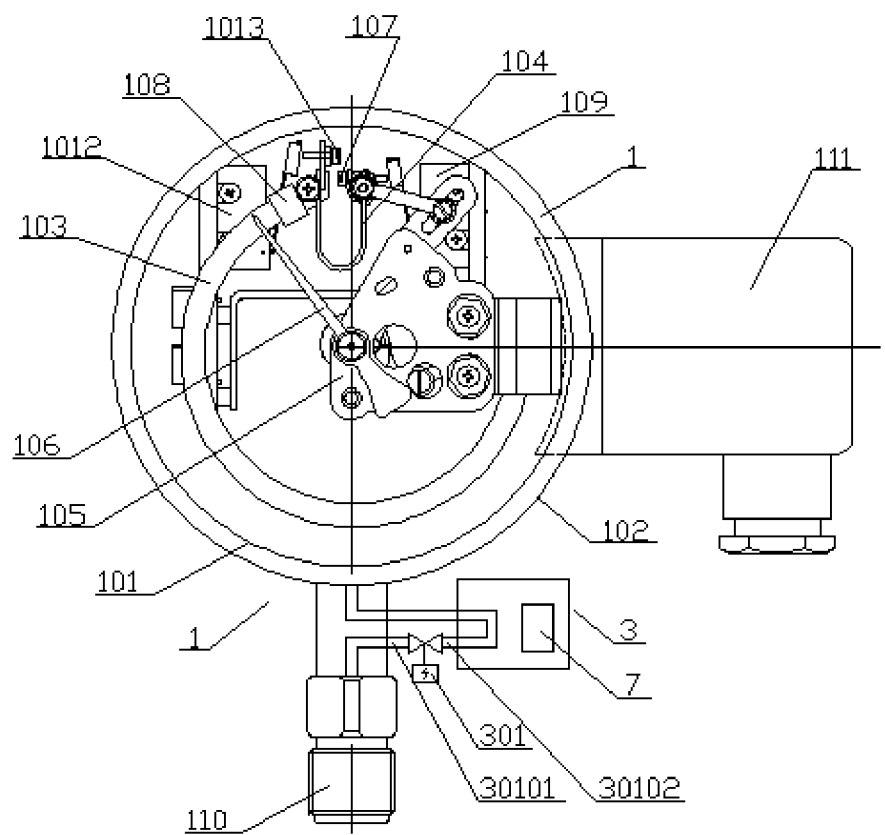
FIG. 7 is a schematic structural diagram of a gas density relay (or gas density monitoring device) with sealing performance self-checking function for high- and medium-voltage electrical equipment according to a seventh embodiment.

As shown in FIG. 7, a gas density relay (or gas density monitoring device) with sealing performance self-checking function according to a seventh embodiment of the present invention mainly includes a gas density relay body 1, a sealing performance detector 3 and an intelligent control unit 7. The sealing performance detector 3 is composed of an output signal contact 1012, which is disposed on the gas density relay body 1. On the circuit, the output signal contact 1012 is connected with the intelligent control unit 7. When the output signal contact 1012 on the gas density relay body 1 acts, the intelligent control unit 7 or the background sends out a gas leakage alarm signal and/or information.

In another preferred embodiment, the sealing performance detector 3 includes an electronic control valve 301 and an output signal contact 1012. The electronic control valve 301 is disposed outside the gas density relay body 1, one end of the electronic control valve 301 is provided with a gas inlet port 30101 connected with electrical equipment, and the other end of the electronic control valve 301 is provided with a gas outlet port 30102 and connected with a gas path of the gas density relay body 1. In this embodiment, the gas outlet port 30102 is connected with a pressure detector 103 of the gas density relay body 1, and the pressure detector 103 is filled with SF6 gas; and the output signal contact 1012 is disposed on the gas density relay body 1. On the circuit, the electronic control valve 301 and the output signal contact 1012 are connected with the intelligent control unit 7 respectively, the electronic control valve 301 is closed through the intelligent control unit 7, the output signal contact 1012 on the gas density relay body 1 acts within a certain time, and the intelligent control unit 7 or the background sends out a gas leakage alarm signal and/or information.

The working principle of this embodiment is as follows: the output signal contact 1012 is disposed on the gas density relay body 1, and the pressure detector 103 and the regulating part 1013 fixed on the end seat 108 trigger the output signal contact 1012 to act. When the density value of sulfur hexafluoride (or other) gas in the gas path of the gas density relay body 1 changes due to gas leakage, the pressure value of the gas also changes correspondingly, forcing the tail end of the pressure detector 103 to generate a corresponding elastic deformation displacement, which drives the regulating part 1013 to trigger the output signal contact 1012 to act. The output signal contact 1012 on the gas density relay body 1 acts, and the intelligent control unit 7 or the background sends out a gas leakage alarm signal and/or information.

Alternatively, the sealing performance detector 3 further includes an electronic control valve 301. When the electronic control valve 301 is closed through the intelligent control unit 7, the air pressure in the gas path of the gas density relay body 1 remains unchanged and an independent sealed gas path is formed. Within a certain time, when the density value of sulfur hexafluoride (or other) gas in the gas path of the gas density relay body 1 changes due to gas leakage, the pressure value of the gas also changes correspondingly, forcing the tail end of the pressure detector 103 to generate a corresponding elastic deformation displacement, which drives the regulating part 1013 to trigger the output signal contact 1012 to act. The output signal contact 1012 on the gas density relay body 1 acts, and the intelligent control unit 7 or the background sends out a gas leakage alarm signal and/or information.

Embodiment 8

Figure 8:
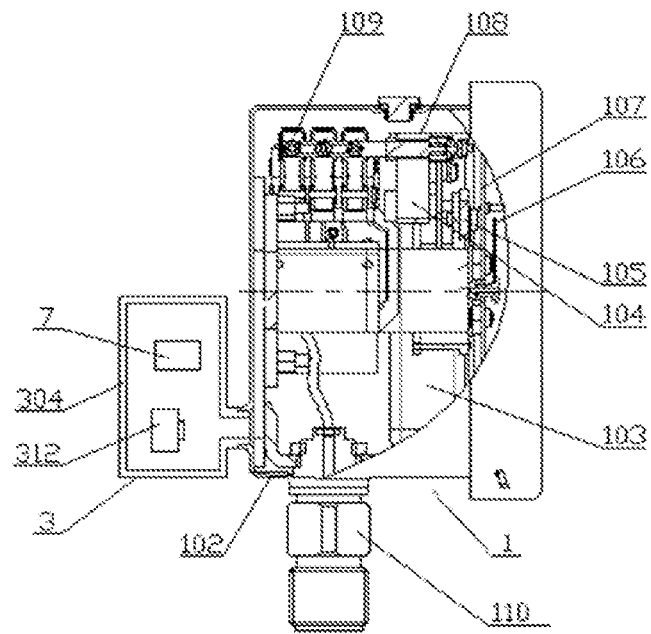
FIG. 8 is a schematic structural diagram of a gas density relay (or gas density monitoring device) with sealing performance self-checking function for high- and medium-voltage electrical equipment according to an eighth embodiment.

As shown in FIG. 8, a gas density relay (or gas density monitoring device) with sealing performance self-checking function according to an eighth embodiment of the present invention mainly includes a gas density relay body 1, a sealing performance detector 3 and an intelligent control unit 7. The sealing performance detector 3 includes a thermal conductivity cell (TCD) detector and/or spectrum analyzer 312, which may be disposed in a shell 102 of the gas density relay body 1; or, the sealing performance detector 3 may further include a gas hood 304, which is disposed outside the gas density relay body 1 and communicated with the shell 102 of the gas density relay body 1 to form a sealed cavity together. The thermal conductivity cell (TCD) detector and/or spectrum analyzer 312 and the intelligent control unit 7 are disposed in the gas hood 304. The thermal conductivity cell (TCD) detector and/or spectrum analyzer 312 are connected with the intelligent control unit 7, the intelligent control unit 7 monitors the SF6 gas concentration in the sealed cavity through the thermal conductivity cell (TCD) detector and/or spectrum analyzer 312, and when the monitored SF6 gas concentration is higher than a preset threshold, the intelligent control unit 7 or the background sends out a gas leakage alarm signal and/or information; or, when the monitored SF6 gas concentration is higher than the normal SF6 gas concentration, the intelligent control unit 7 or the background sends out a gas leakage alarm signal and/or information.

The working principle of this embodiment is as follows: the gas hood 304 is disposed outside the gas density relay body 1 and communicated with the shell 102 of the gas density relay body 1 to form a sealed cavity. Under normal circumstances, the sealed cavity is filled with a gas with certain stability, which is generally but not limited to one or more of dry air, nitrogen or other oxygen mixed gases. Normally, the amount of the dry air in the sealed cavity is constant, and the thermal conductivity cell (TCD) detector and/or spectrum analyzer 312 is used to monitor the SF6 gas concentration in the dry air, that is, the SF6 gas concentration in the sealed cavity is constant. When gas leakage occurs in the gas path of the gas density relay body 1, the leaked gas will be sealed in the sealed cavity, which will increase the SF6 gas concentration in the sealed cavity. The intelligent control unit 7 monitors the SF6 gas concentration through the thermal conductivity cell (TCD) detector and/or spectrum analyzer 312, and when the monitored SF6 gas concentration is higher than a preset threshold, the intelligent control unit 7 or the background sends out a gas leakage alarm signal and/or information; or, when the monitored SF6 gas concentration is higher than the normal SF6 gas concentration, the intelligent control unit 7 or the background sends out a gas leakage alarm signal and/or information.

Embodiment 9

Figure 9:
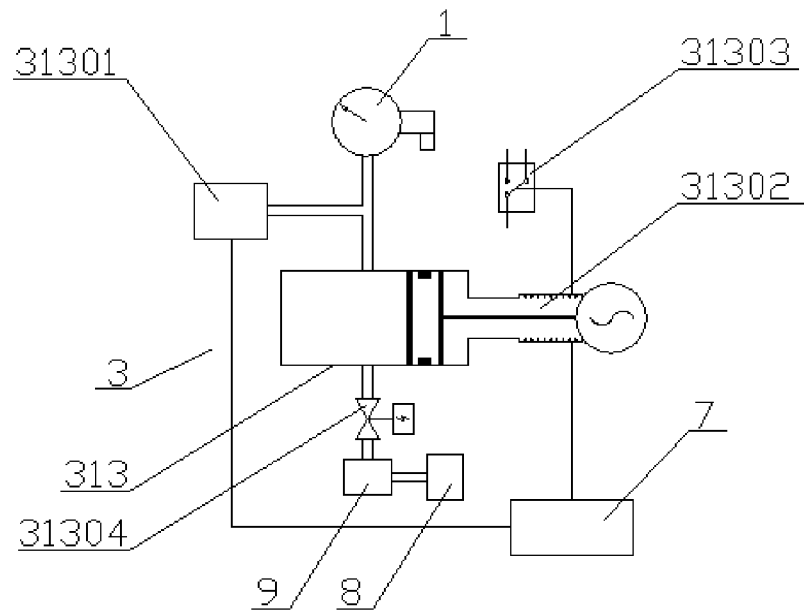
FIG. 9 is a schematic structural diagram of a gas density relay (or gas density monitoring device) with sealing performance self-checking function for high- and medium-voltage electrical equipment according to a ninth embodiment.

As shown in FIG. 9, a gas density relay (or gas density monitoring device) with sealing performance self-checking function according to a ninth embodiment of the present invention mainly includes a gas density relay body 1, a sealing performance detector 3 and an intelligent control unit 7. The sealing performance detector 3 includes an on-line calibration unit 313 including a gas density detection sensor 31301, a pressure regulating mechanism 31302, an on-line calibration contact signal sampling unit 31303 and an electronic control valve 31304.

The working principle of this embodiment is as follows: the gas path of the pressure regulating mechanism 31302 is communicated with the gas density relay body 1 and one end (gas outlet end) of the electronic control valve 31304, and the pressure regulating mechanism 30102 is configured to regulate the gas pressure rise and drop of the gas density relay body 1, so that a contact signal control part of the gas density relay body 1 (such as a signal generator, including a micro switch or a magnetically assisted electric contact) generates a contact signal action; the other end (gas inlet end) of the electronic control valve 31304 is connected with electrical equipment 8 by a multi-pass joint 9; the on-line calibration contact signal sampling unit 31303 is connected with the contact signal control part of the gas density relay body 1 and configured to sample a contact signal of the contact signal control part of the gas density relay body 1; the gas density detection sensor 31301 is communicated with the contact signal control part of the gas density relay body 1 on the gas path and configured to collect a temperature value, a pressure value, and/or a gas density value of the gas density relay body 1; the intelligent control unit 7 is connected with the gas density detection sensor 31301, the pressure regulating mechanism 30102, the on-line calibration contact signal sampling unit 31303, and the electronic control valve 31304 respectively and configured to complete control of the pressure regulating mechanism 31302, pressure value acquisition and temperature value acquisition, and/or gas density value acquisition, detect a contact signal action value and/or a contact signal return value of the contact signal control part of the gas density relay body 1, and control the closing or opening of the electronic control valve 31304.

When the detected contact signal action value is less than a preset threshold, the intelligent control unit 7 or the background sends out a gas leakage alarm signal and/or information; or, at time T1, the detected contact signal action value is $P_{20T1}$; after a set time, at time T2, the detected contact signal action value is $P_{20T2}$; and when $(P_{20T1}-P_{20T2})$ is greater than or equal to the preset threshold, the intelligent control unit 7 or the background sends out a gas leakage alarm signal and/or information.

The pressure regulating mechanism 30102 of this embodiment is a cavity with one end open, a piston is disposed in the cavity, the piston is provided with a sealing ring, one end of the piston is connected with a regulating rod, the outer end of the regulating rod is connected with a driving part, the other end of the piston extends into the opening and is in contact with the inner wall of the cavity, and the driving part drives the regulating rod to drive the piston to move in the cavity. The driving part includes, but is not limited to, one of a magnetic driving mechanism, a motor, a reciprocating mechanism, a Carnot cycle mechanism, a magnetic coupling thrust mechanism, a heating thrust generating mechanism, an electric heating thrust generating mechanism, a chemical reaction thrust generating mechanism, and a pneumatic element. The pressure regulating mechanism 30102 may further include a seal coupling disposed between the cavity and the driving part, so that the regulating rod passes through the seal coupling and is connected to the driving part, which ensures good sealing performance of the entire pressure regulating mechanism 30102. The seal coupling includes, but is not limited to, one of a corrugated tube, a gasbag, and a sealing ring.

In another preferred embodiment, the pressure regulating mechanism 30102 may also consist of a corrugated tube and a driving part, and the corrugated tube is hermetically connected with the gas path of the gas density relay body 1 to form a reliable sealed cavity. According to the control of the intelligent control unit 7, the pressure regulating mechanism 30102 causes the driving part to push the corrugated tube to change in volume, and then the sealed cavity changes in volume, thus completing the rise and drop of the gas pressure of the gas density relay body 1.

In another preferred embodiment, the pressure regulating mechanism 30102 may also consist of a gas chamber, a heating element and a heat preservation part. The gas chamber is hermetically connected with the gas path of the gas density relay body 1, and the heating element is disposed outside (or inside) the gas chamber. The temperature is changed by heating, thus completing the rise and drop of the gas pressure of the gas density relay body 1.

Of course, the pressure regulating mechanism 30102 may also be in a variety of other forms, and is not limited to those listed above. Other mechanisms capable of realizing the gas pressure rise and drop function also fall within the protection scope of the present application.

Embodiment 10

Figure 10:
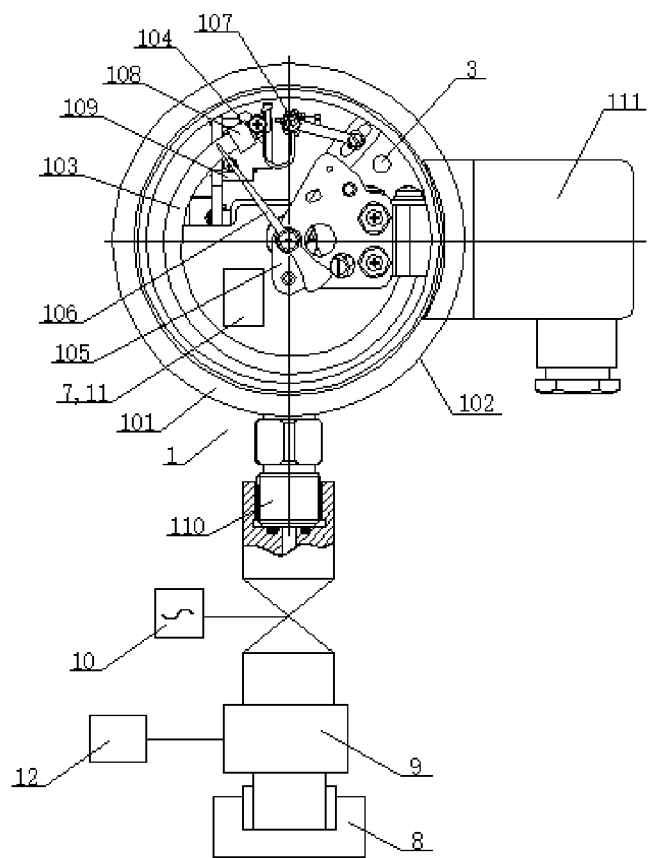
FIG. 10 is a schematic structural diagram of a gas density relay (or gas density monitoring device) with sealing performance self-checking function for high- and medium-voltage electrical equipment according to a tenth embodiment.

FIG. 10 is a schematic diagram of a front structure of a gas density relay (or gas density monitoring device) with sealing performance self-checking function for high-voltage electrical equipment according to a tenth embodiment of the present invention. As shown in FIG. 10, different from the second embodiment, a multi-pass joint 9, a gas leakage shutoff part 10, a contact isolation unit 11, and an equipment side gas density detection sensor 12 are further added in this embodiment. The intelligent control unit 7 is connected with the gas leakage shutoff part 10, the contact isolation unit 11 and the equipment side gas density detection sensor 12 respectively. One end of the gas leakage shutoff part 10 is connected with the multi-pass joint 9, the multi-pass joint 9 is connected with electrical equipment 8, and the other end of the gas leakage shutoff part 10 is connected with a joint 110 of the gas density relay body 1; the gas leakage shutoff part 10 is configured to close the gas path connecting the electrical equipment 8 and one side of the gas density relay body 1 when the sealing performance on the side of the gas density relay body 1 is abnormal. The contact isolation unit 11 is further connected with the gas density relay body 1 directly or indirectly and configured to disconnect the contact of the gas density relay body 1 from the contact signal control loop when the gas leakage shutoff part 10 closes. The equipment side gas density detection sensor 12 (a pressure sensor and a temperature sensor, or a pressure sensor and a temperature sensor on on-line calibration may be used in this example) is disposed on the multi-pass joint 9 on the side of the gas leakage shutoff part 10 connected with the electrical equipment 8, and the intelligent control unit 7 is connected with the equipment side gas density detection sensor 12 and configured to monitor the gas density value $P_{SB20}$ of the electrical equipment 8. The contact isolation unit 11 and the intelligent control unit 7 may be disposed together.

The gas leakage monitoring principle of this embodiment is the same as that of the second embodiment, so details are not described herein again. The difference is that when gas leakage occurs on one side of the gas density relay body 1, the gas path connecting the electrical equipment 8 and one side of the gas density relay body 1 may be closed by controlling the gas leakage shutoff part 10, so as to prevent continued gas leakage, that is, to prevent the gas leakage accident from continuing to occur. The specific working principle is that the gas leakage shutoff part 10 in this embodiment may include one of an electronic control valve, a solenoid valve, an electronic control self-sealing valve and a temperature control valve. When the sealing performance on one side off the gas density relay body 1 is abnormal, that is, when the intelligent control unit 7 or the background sends out a gas leakage alarm signal and/or information, the intelligent control unit 7 controls the gas leakage shutoff part 10 to close the gas path connecting the electrical equipment 8 and one side of the gas density relay body 1; when the gas leakage shutoff part 10 (such as an electronic control valve) is closed, the intelligent control unit 7 monitors the gas density value $P_{SB20}$ of the electrical equipment 8 through the equipment side gas density detection sensor 12; when the monitored gas density value $P_{SB20}$ of the electrical equipment 8 is greater than a preset threshold (generally slightly greater than a locking value or an alarm value), the intelligent control unit 7 controls the contact isolation unit 11 to disconnect the contact of the gas density relay body 1 from the contact signal control loop; and when the monitored gas density value $P_{SB20}$ of the electrical equipment 8 is less than or equal to the preset threshold, the intelligent control unit 7 controls the contact isolation unit 11 to connect the contact of the gas density relay body 1 with the contact signal control loop (switched from the original disconnection). In this way, when gas leakage occurs on one side of the gas density relay body 1, the gas path connecting the electrical equipment 8 and one side of the gas density relay body 1 can be closed by controlling the gas leakage shutoff part 10 to prevent continued gas leakage, that is, prevent the gas leakage accident from continuing to occur; meanwhile, the intelligent control unit 7 also monitors the gas density value $P_{SB20}$ of the electrical equipment 8 in real time through the equipment side gas density detection sensor 12, and controls the contact isolation unit 11 in real time according to the circumstance, which ensures that the electrical equipment 8 still operates reliably, that is, when the gas density value $P_{SB20}$ is greater than the preset threshold, the contact isolation unit 11 works, and any error signal will not be uploaded to cause locking or false alarm; and when the gas density value $P_{SB20}$ is less than or equal to the preset threshold, the contact isolation unit 11 does not work, and the gas density relay 1 sends out an alarm or locking signal. In addition, the intelligent control unit 7 or the background sends out gas leakage information in time, so that the operation and maintenance personnel can know and deal with the gas leakage event in time. In this way, gas leakage occurring in the gas density relay body 1 can be avoided, and the emission of SF6 gas into the air can be reduced, so the gas density relay is safer and beneficial to environmental protection. The above-mentioned gas leakage occurring on one side of the gas density relay body 1 generally refers to gas leakage occurring in the devices or components such as the gas density relay body 1 (such as the Baden tube, welding places and joints), or some sealing performance detectors, or on-line calibration units (such as gas density detection sensor and pressure regulating mechanisms).

In short, after the gas density relay completes the gas leakage performance diagnosis of the gas density relay body 1, if there is any abnormality, an alarm can be automatically sent to a remote end or a designated receiver, such as a mobile phone. The communication mode is wired or wireless, where the wired communication mode may be industrial buses such as RS232, RS485 and CAN-BUS, optical fiber Ethernet, 4-20 mA, Hart, IIC, SPI, Wires, coaxial cables, PLC power carriers, etc.; and the wireless communication mode may be 2G/3G/4G/5G, WIFI, Bluetooth, Lora, Lorawan, Zigbee, infrared, ultrasonic, acoustic, satellites, light wave, quantum communication, sonar, built-in 5G/NB-IOT communication modules (such as NB-IOT) in sensor, etc. That is, the reliability of the gas density relay can be fully guaranteed in multiple modes and combinations.

Figure 11:
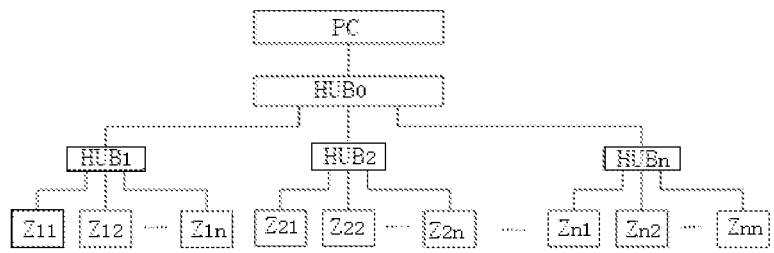
FIG. 11 to FIG. 13 are schematic structural diagrams of a gas density monitoring system with sealing performance self-checking function.
Figure 12:
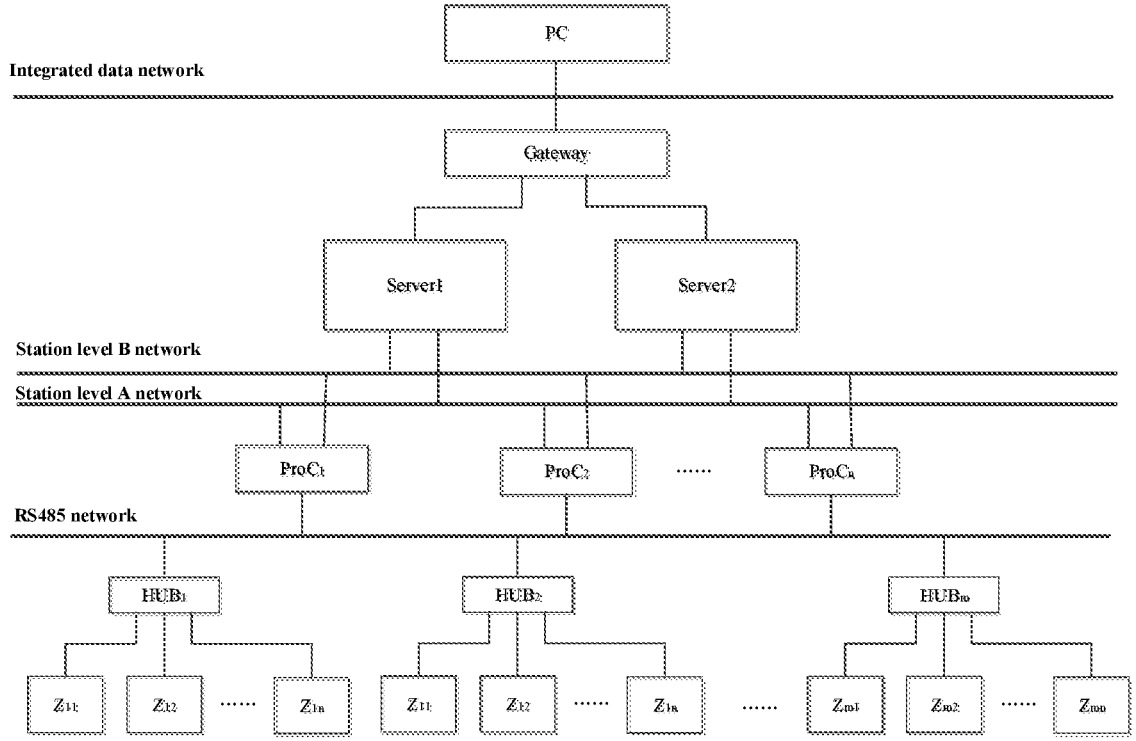
Figure 13:
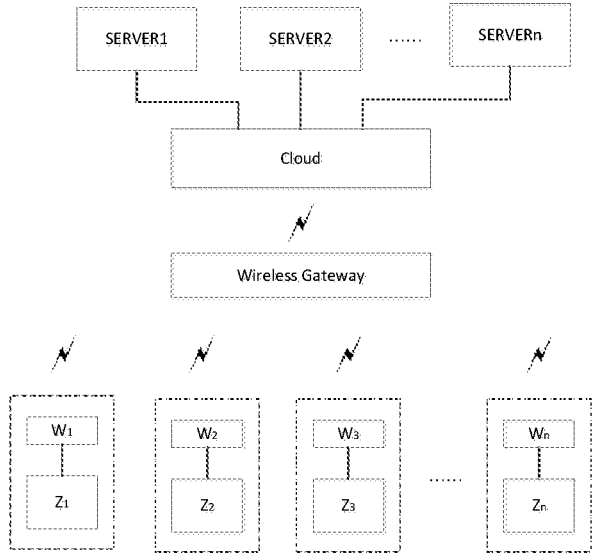

FIG. 11 to FIG. 13 show a gas density system with sealing performance self-checking function. The gas density monitoring system includes the above-mentioned gas density relay (or gas density monitoring device) with sealing performance self-checking function.

As shown in FIG. 11, a plurality of electrical equipment provided with gas chambers and a plurality of gas density relays (or gas density monitoring devices) with sealing performance self-checking function are sequentially connected with a remote background detection system through hubs and an IEC61850 protocol converter. The gas density relays (or gas density monitoring devices) with sealing performance self-checking function are respectively disposed on the electrical equipment with corresponding gas chambers.

As shown in FIGS. 11 and 12, PC is an on-line monitoring background host and system, Gateway is a network switch, Server is an integrated application server, ProC is a protocol converter/on-line monitoring intelligent unit, HUB is a concentrator, and Z is the gas density relay (or gas density monitoring device) with sealing performance self-checking function. The on-line monitoring system architecture includes: detailed simple architecture (FIG. 11), conventional architecture (FIG. 12), complex architecture, etc.

System architecture diagrams and simple descriptions: 1) Background software platform: based on Windows, Linux and others, or VxWorks, Android, Unix, UCos, FreeRTOS, RTX, embOS, MacOS. 2) Key service modules and basic functions of background software: for example, authority management, equipment management, data storage and query, etc.; and user management, alarm management, real-time data, historical data, real-time curves, historical curves, configuration management, data collection, data analysis, recording conditions, and exception handling. 3) Interface configuration: for example, Form interface, Web interface, configuration interface, etc.

Specifically, as shown in FIG. 11, the on-line monitoring background host and system PC communicates with a plurality of hubs (HUB1, HUB2 . . . HUBm) through the hub HUB0. Each HUB is connected with a group of gas density relays (or gas density monitoring devices) Z with sealing performance self-checking function, for example, the hub HUB1 is connected with gas density relays (or gas density monitoring devices) Z11, Z12 . . . Z1n with sealing performance self-checking function, the hub HUB2 is connected with gas density relays (or gas density monitoring devices) Z21, Z22 . . . Z2n with sealing performance self-checking function . . . and the hub HUBm is connected with gas density relays (or gas density monitoring devices) Zm1, Zm2 . . . Zmn with sealing performance self-checking function, where m and n are natural numbers.

As shown in FIG. 12, the on-line monitoring background host and system PC is connected with two integrated application servers Server1 and Server2 through the network switch Gateway, the two integrated application servers Server1 and Server2 communicate with a plurality of protocol converters/on-line monitoring intelligent units ProC (ProC1, ProC2 . . . ProCn) through a station control layer A network and B network, and the protocol converters/on-line monitoring intelligent units ProC communicate with a plurality of hubs HUB (HUB1, HUB2, . . . HUBm) through an R5485 network. Each HUB is connected with a group of gas density relays (or gas density monitoring devices) Z with sealing performance self-checking function, for example, the hub HUB1 is connected with gas density relays (or gas density monitoring devices) Z11, Z12 . . . Z1n with sealing performance self-checking function, the hub HUB2 is connected with gas density relays (or gas density monitoring devices) Z21, Z22 . . . Z2n with sealing performance self-checking function . . . and the hub HUBm is connected with gas density relays (or gas density monitoring devices) Zm1, Zm2 . . . Zmn with sealing performance self-checking function, where m and n are natural numbers.

FIG. 13 is an architecture system diagram of a wireless transmission mode. Each dotted box in the figure indicates that a wireless module Wn and a gas density relay Zn may be integrated or split, and the specific scheme may be flexible. A plurality of integrated application servers Server1, Server2 . . . Server n communicate with gas density relays wirelessly through a Cloud, a Wireless Gateway, and respective wireless modules of the gas density relays. Herein, n is a natural number.

The gas density relay (or gas density monitoring device) with sealing performance self-checking function can diagnose whether the gas density relay (or gas density monitoring device) leaks gas and send out a gas leakage alarm signal and/or information.

It should be noted that, in the present application, the constituent elements of the gas density relay with sealing performance self-checking function are designed into an integrated structure; and the constituent elements of the gas density monitoring device with sealing performance self-checking function are designed into a flexible split structure. The gas density relay may be from the existing gas density relay of a substation by technical transformation and upgrade. In addition, the sealing performance detector includes an oxygen sensor and/or nitrogen sensor and a gas hood, the gas hood is disposed outside the gas density relay body and may not be directly communicated with the shell of the gas density relay body, but covers the place where gas leakage occurs to form a cavity, and the oxygen sensor and/or nitrogen sensor (or other sealing performance detector) are disposed in the gas hood. The gas hood is configured to collect leaked gas, which helps to accumulate more leaked gas and makes the test more accurate. The gas hood may be configured correspondingly according to needs. In short, the sealing performance detector is disposed inside or outside the gas density relay and communicated with the gas path in the gas density relay body or the inner cavity of the gas density relay body, and obtains gas leakage information of the gas density relay body or device by collecting the gas pressure change, current change, gas concentration change or gas density value change on the gas path or in the inner cavity formed by the gas hood.

The specific embodiments of the present invention are described in detail above, but serve as examples only, and the present invention is not limited to the specific embodiments described above. For those skilled in the art, any equivalent modifications and substitutions made to the present invention also fall within the scope of the present invention. Accordingly, equivalent alterations and modifications made without departing from the spirit and scope of the present invention shall fall within the scope of the present invention.

What is claimed is:

1. A gas density relay with sealing performance self-checking function, comprising a gas density relay body, a sealing performance detector and an intelligent control unit, wherein the sealing performance detector is disposed inside or outside the gas density relay body and communicated with a gas path in the gas density relay body or an inner cavity of the gas density relay body, and obtains gas leakage information of the gas density relay body by collecting the gas pressure change, current change, gas concentration change or gas density value change on the gas path or in the inner cavity; and the intelligent control unit is connected with the sealing performance detector, receives the data monitored by the sealing performance detector, and performs diagnosis to obtain the current sealing performance of the gas density relay body.

2. The gas density relay with sealing performance self-checking function according to claim 1, wherein the sealing performance detector comprises one or more of an electronic control valve, a pressure sensor, a voltage exciter, an electrode, a current detector, an oxygen sensor, a nitrogen sensor, an SF6 diagnosis sensor, a halogen sensor, a camera, an output signal contact, a thermal conductivity cell detector, a spectrum analyzer, and an on-line calibration unit.

3. The gas density relay with sealing performance self-checking function according to claim 2, wherein the sealing performance detector is disposed outside the gas density relay body and comprises an electronic control valve and a pressure sensor; one end of the electronic control valve is provided with a gas inlet port connected with electrical equipment, and the other end is provided with a gas outlet port communicated with the gas path of the gas density relay body; the pressure sensor is communicated with the gas path of the gas density relay body; the electronic control valve is connected with the intelligent control unit and closed or opened under the control of the intelligent control unit; the pressure sensor is connected with the intelligent control unit and sends the collected gas pressure on the gas path of the gas density relay body to the intelligent control unit; and if the gas pressure on the gas path of the gas density relay body gradually decreases, the intelligent control unit sends out a gas leakage alarm signal; or, when the drop speed $PS_x$ of the gas pressure on the gas path of the gas density relay body is higher than a set drop speed $PS_{xs}$, the intelligent control unit sends out a gas leakage alarm signal; or, in a set time, when the gas pressure on the gas path of the gas density relay body is lower than a gas pressure value when the electronic control valve is closed, the intelligent control unit sends out a gas leakage alarm signal.

4. The gas density relay with sealing performance self-checking function according to claim 2, wherein the sealing performance detector is a pressure sensor disposed in a shell of the gas density relay body, and the pressure sensor is connected with the intelligent control unit and sends a collected pressure signal $P_{shell}$ in the shell of the gas density relay body to the intelligent control unit; and if the pressure signal $P_{shell}$ in the shell of the gas density relay body gradually increases, the intelligent control unit sends out a gas leakage alarm signal; or, when the rising speed $P_{SshellZ}$ of the pressure signal $P_{shell}$ in the shell of the gas density relay body is higher than a set rising speed $P_{SshellZS}$, the intelligent control unit sends out a gas leakage alarm signal; or, when the pressure signal $P_{shell}$ in the shell of the gas density relay body is higher than a set pressure value $P_{shellS}$, the intelligent control unit sends out a gas leakage alarm signal.

5. The gas density relay with sealing performance self-checking function according to claim 2, wherein the sealing performance detector comprises a voltage exciter, an electrode, and a current detector, which are disposed in the shell of the gas density relay body; or, the sealing performance detector comprises a voltage exciter, an electrode, a current detector, and a gas hood which is disposed outside the gas density relay body and communicated with the shell of the gas density relay body, the gas hood and the inner cavity of the shell form a cavity together, and the voltage exciter, the electrode and the current detector are disposed in the gas hood; and the voltage exciter, the electrode and the current detector form a loop, a high voltage is applied to both ends of the electrode by the voltage exciter, and the intelligent control unit monitors the leakage current Ileakage of the current detector; and if the leakage current $I_{leakage}$ gradually decreases, the intelligent control unit sends out a gas leakage alarm signal; or, when the leakage current $I_{leakage}$ is lower than a set leakage current $I_{leakageS}$, the intelligent control unit sends out a gas leakage alarm signal; or, the leakage current is $I_{leakage1}$ when no gas leaks, and if ($I_{leakage1}-I_{leakage}$) is greater than or equal to a preset threshold, the intelligent control unit sends out a gas leakage alarm signal.

6. The gas density relay with sealing performance self-checking function according to claim 2, wherein the sealing performance detector comprises an oxygen sensor or/and nitrogen sensor disposed in the shell of the gas density relay body; or, the sealing performance detector comprises an oxygen sensor or/and nitrogen sensor and a gas hood, the gas hood is disposed outside the gas density relay body and communicated with the shell of the gas density relay body, the gas hood and the inner cavity of the shell form a cavity together, and the oxygen sensor or/and nitrogen sensor are disposed in the gas hood; and the intelligent control unit monitors the oxygen concentration or/and nitrogen concentration in the shell through the oxygen sensor or/and nitrogen sensor, and when the monitored oxygen concentration or/and nitrogen concentration are lower than preset thresholds, the intelligent control unit sends out a gas leakage alarm signal; or, when the monitored oxygen concentration or/and nitrogen concentration are lower than the normal oxygen concentration or/and nitrogen concentration, the intelligent control unit sends out a gas leakage alarm signal.

7. The gas density relay with sealing performance self-checking function according to claim 2, wherein the sealing performance detector comprises an SF6 diagnosis sensor, and the SF6 diagnosis sensor comprises one of an ultrasonic sensor, an infrared sensor, a laser sensor and a gas-sensitive semiconductor sensor; the SF6 diagnosis sensor is disposed in the shell of the gas density relay body; or, the sealing performance detector comprises an SF6 diagnosis sensor and a gas hood, the gas hood is disposed outside the gas density relay body and communicated with the shell of the gas density relay body, the gas hood and the inner cavity of the shell form a cavity together, and the SF6 diagnosis sensor is disposed in the gas hood; and the intelligent control unit monitors the SF6 gas concentration in the shell through the SF6 diagnosis sensor, and when the monitored SF6 gas concentration is higher than a preset threshold, the intelligent control unit sends out a gas leakage alarm signal; or, when the monitored SF6 gas concentration is higher than the normal SF6 gas concentration, the intelligent control unit sends out a gas leakage alarm signal.

8. The gas density relay with sealing performance self-checking function according to claim 2, wherein the sealing performance detector is disposed outside the gas density relay body and comprises an electronic control valve and a camera; one end of the electronic control valve is provided with a gas inlet port connected with electrical equipment, and the other end is provided with a gas outlet port communicated with the gas path of the gas density relay body; the camera is disposed corresponding to a display part of the gas density relay body; the electronic control valve is connected with the intelligent control unit and closed or opened under the control of the intelligent control unit; the camera obtains a gas density value on the gas path of the gas density relay body through image recognition technology and sends the gas density value to the intelligent control unit; and if the gas density value on the gas path of the gas density relay body gradually decreases, the intelligent control unit sends out a gas leakage alarm signal; or, when the decline rate of the gas density value on the gas path of the gas density relay body is higher than a set decline rate, the intelligent control unit sends out a gas leakage alarm signal; or, in a set time, when the gas density value on the gas path of the gas density relay body is lower than a gas density value when the electronic control valve is closed, the intelligent control unit sends out a gas leakage alarm signal.

9. The gas density relay with sealing performance self-checking function according to claim 8, wherein the sealing performance detector further comprises a test paper or chemical change reagent disposed on the gas density relay body; when gas leakage occurs in the gas density relay, the test paper or chemical change reagent changes color, the camera obtains a color change image through image recognition technology to obtain gas leakage information of the gas density relay, and the intelligent control unit sends out a gas leakage alarm signal.

10. The gas density relay with sealing performance self-checking function according to claim 8, wherein the information of the gas density relay obtained by the camera through the image recognition technology comprises one or more of gas leakage, water inflow, rusting, foreign matter invasion, dial blurring, rubber aging, rubber fracture, device breakage, device drop, and device jamming.

11. The gas density relay with sealing performance self-checking function according to claim 2, wherein the sealing performance detector is an output signal contact, which is disposed on the gas density relay body and connected with the intelligent control unit; the intelligent control unit sends out a gas leakage alarm signal when the output signal contact acts; or, the sealing performance detector comprises an electronic control valve and an output signal contact, the electronic control valve is disposed outside the gas density relay body, one end of the electronic control valve is provided with a gas inlet port connected with electrical equipment, the other end is provided with a gas outlet port communicated with the gas path of the gas density relay body, and the electronic control valve is connected with the intelligent control unit and closed or opened under the control of the intelligent control unit; the output signal contact is disposed on the gas density relay body and connected with the intelligent control unit; and the intelligent control unit sends out a gas leakage alarm signal after the electronic control valve is closed and when the output signal contact acts.

12. The gas density relay with sealing performance self-checking function according to claim 2, wherein the sealing performance detector comprises a thermal conductivity cell detector or/and spectrum analyzer disposed in the shell of the gas density relay body; or, the sealing performance detector comprises a thermal conductivity cell detector or/and spectrum analyzer and a gas hood, the gas hood is disposed outside the gas density relay body and communicated with the shell of the gas density relay body, the gas hood and the inner cavity of the shell form a cavity together, and the thermal conductivity cell detector or/and spectrum analyzer are disposed in the gas hood; and the intelligent control unit monitors the SF6 gas concentration in the sealed cavity through the thermal conductivity cell detector or/and spectrum analyzer, and when the monitored SF6 gas concentration is higher than a preset threshold, the intelligent control unit sends out a gas leakage alarm signal;

or, when the monitored SF6 gas concentration is higher than the normal SF6 gas concentration, the intelligent control unit sends out a gas leakage alarm signal.

13. The gas density relay with sealing performance self-checking function according to claim 2, wherein the sealing performance detector comprises an on-line calibration unit comprising a gas density detection sensor, a pressure regulating mechanism and an on-line calibration contact signal sampling unit; the gas path of the pressure regulating mechanism is communicated with the gas path of the gas density relay body, and the pressure regulating mechanism regulates the pressure rise and drop of the gas density relay body, so that a contact signal control part of the gas density relay generates a contact signal action; the gas density detection sensor is communicated with the contact signal control part on the gas path; the on-line calibration contact signal sampling unit is connected with the contact signal control part and samples a contact signal of the contact signal control part; the intelligent control unit is connected with the pressure regulating mechanism, the gas density detection sensor, and the on-line calibration contact signal sampling unit respectively to complete the control of the pressure regulating mechanism, pressure value acquisition and temperature value acquisition, and/or gas density value acquisition, and to detect the contact signal action value of the contact signal control part, where the contact signal comprises alarm and/or locking; and when the detected contact signal action value is less than a preset threshold, the intelligent control unit sends out a gas leakage alarm signal;

or, at time T1, the detected contact signal action value is $P_{20T1}$; after a set time, at time T2, the detected contact signal action value is $P_{20T2}$; and when $(P_{20T1}-P_{20T2})$ is greater than or equal to the preset threshold, the intelligent control unit sends out a gas leakage alarm signal.

14. The gas density relay with sealing performance self-checking function according to claim 13, wherein the pressure regulating mechanism is a closed gas chamber communicated with the gas path of the gas density relay body; a heating element and/or a refrigerating element are disposed outside or inside the closed gas chamber, and the temperature of gas in the closed gas chamber is changed by means of heating of the heating element and/or refrigeration of the refrigerating element, thus completing the pressure rise and drop of the gas density relay body; or, the pressure regulating mechanism is a cavity with one end open, and the other end of the cavity is communicated with the gas path of the gas density relay body; a piston is disposed in the cavity, one end of the piston is connected with a regulating rod, the outer end of the regulating rod is connected with a driving part, the other end of the piston extends into the opening and is in sealed contact with the inner wall of the cavity, and the driving part drives the regulating rod to drive the piston to move in the cavity; or, the pressure regulating mechanism is a closed gas chamber communicated with the gas path of the gas density relay body; a piston is disposed inside the closed gas chamber, the piston is in sealed contact with the inner wall of the closed gas chamber, and a driving part is disposed outside the closed gas chamber, and the driving part pushes the piston to move in the cavity by means of electromagnetic force;

or, the pressure regulating mechanism is a gasbag with one end connected with a driving part, the gasbag changes in volume under the drive of the driving part, and the gasbag is communicated with the gas path of the gas density relay body; or, the pressure regulating mechanism is a corrugated tube, one end of the corrugated tube is communicated with the gas path of the gas density relay body, and the other end of the corrugated tube expands and contracts under the drive of a driving part;

or, the pressure regulating mechanism is a bleeder valve which is a solenoid valve or an electric valve; or, the pressure regulating mechanism is a compressor; or, the pressure regulating mechanism is a pump, and the pump comprises one of a pressure generating pump, a booster pump, an electric air pump, and an electromagnetic air pump; or, the pressure regulating mechanism is a pressure increasing valve;

the driving part comprises a magnetic driving mechanism, a motor, a reciprocating mechanism, a Carnot cycle mechanism, a magnetic coupling thrust mechanism, a heating thrust generating mechanism, an electric heating thrust generating mechanism, a chemical reaction thrust generating mechanism, and a pneumatic element.

15. The gas density relay with sealing performance self-checking function according to claim 1, wherein the gas density relay further comprises a gas leakage shutoff part and a contact isolation unit, and the intelligent control unit is connected with the gas leakage shutoff part and the contact isolation unit respectively; one end of the gas leakage shutoff part is connected with the electrical equipment, and the other end of the gas leakage shutoff part is connected with the gas density relay body; the gas leakage shutoff part comprises one of an electronic control valve, a solenoid valve, an electronic control self-sealing valve and a temperature control valve, and is configured to close the gas path connecting the electrical equipment and the gas density relay body when the sealing performance of the gas density relay body is abnormal; the contact isolation unit is further directly or indirectly connected with the gas density relay body and configured to disconnect the contact of the gas density relay body from the contact signal control loop when the gas leakage shutoff closes.

16. The gas density relay with sealing performance self-checking function according to claim 15, wherein the gas density relay further comprises an equipment side gas density detection sensor, the equipment side gas density detection sensor is disposed on the side of the gas leakage shutoff part connected with the electrical equipment, and the equipment side gas density detection sensor is connected with the intelligent control unit and configured to monitor the gas density value $P_{SB20}$ of the electrical equipment;

the contact isolation unit comprises an isolation connection circuit which connects the contact of the gas density relay body with the contact signal control loop; and when the gas leakage shutoff closes, if the gas density value $P_{SB20}$ of the electrical equipment monitored by the equipment side gas density detection sensor is greater than a preset threshold, the contact isolation unit cuts off the isolation connection circuit, so that the contact of the gas density relay body is not connected with the contact signal control loop; if the gas density value $P_{SB20}$ of the electrical equipment monitored by the equipment side gas density detection sensor is less than or equal to the preset threshold, the isolation connection circuit is closed, so that the contact of the gas density relay body is connected with the contact signal control loop.

17. The gas density relay with sealing performance self-checking function according to claim 1, wherein at least two gas density relays are sequentially connected with a remote detection system through hubs and a protocol converter, wherein the gas density relays are disposed on the electrical equipment with corresponding gas chambers.

18. An implementation method for the gas density relay with sealing performance self-checking function according to claim 1, wherein the method comprises:

disposing a sealing performance detection detector inside or outside the gas density relay body and communicated with the gas path in the gas density relay body or the inner cavity of the gas density relay body to obtain gas leakage information of the gas density relay body by collecting the gas pressure change, current change, gas concentration change or gas density value change on the gas path or in the inner cavity;

connecting the intelligent control unit with the sealing performance detection unit, and the intelligent control unit receives the data monitored by the sealing performance detection unit, and performs diagnosis to obtain the current sealing performance of the gas density relay body.

19. The implementation method for the gas density relay with sealing performance self-checking function according to claim 18, wherein the sealing performance detector comprises one or more of an electronic control valve, a pressure sensor, a voltage exciter, an electrode, a current detector, an oxygen sensor, a nitrogen sensor, an SF6 diagnosis sensor, a halogen sensor, a camera, an output signal contact, a thermal conductivity cell detector, a spectrum analyzer, and an on-line calibration unit.

* * * * *